US012683662B2

(12) United States Patent
Hu et al.

(10) Patent No.: US 12,683,662 B2
(45) Date of Patent: Jul. 14, 2026

(54) COMMUNICATION METHOD AND APPARATUS FOR INDICATING CHANNEL STATE INFORMATION CHANGES

(71) Applicant: HUAWEI TECHNOLOGIES CO., LTD., Shenzhen (CN)

(72) Inventors: Mengshi Hu, Shenzhen (CN); Xiao Han, Shenzhen (CN); Rui Du, Shenzhen (CN); Yi Lv, Shenzhen (CN); Xun Yang, Shenzhen (CN); Chenchen Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 18/437,384

(22) Filed: Feb. 9, 2024

(65) Prior Publication Data

US 2024/0187065 A1 Jun. 6, 2024

Related U.S. Application Data

(63) Continuation of application No. PCT/CN2022/111096, filed on Aug. 9, 2022.

(30) Foreign Application Priority Data

Aug. 11, 2021 (CN) .......................... 202110921247.7

(51) Int. Cl.
*H04B 7/06* (2006.01)
*H04L 5/00* (2006.01)
*H04W 74/0808* (2024.01)

(52) U.S. Cl.
CPC ......... *H04B 7/0626* (2013.01); *H04L 5/0044* (2013.01); *H04W 74/0808* (2013.01)

(58) Field of Classification Search
CPC .............. H04B 7/0626; H04L 5/0044; H04W 74/0808; H04W 24/02
See application file for complete search history.

(56) References Cited

U.S. PATENT DOCUMENTS

2012/0250543 A1* 10/2012 Abraham .............. H04L 1/0028
370/252
2020/0403680 A1* 12/2020 Li ........................ H04B 7/0632
(Continued)

FOREIGN PATENT DOCUMENTS

WO WO-2018101979 A2 * 6/2018 ........... H04L 1/0026

OTHER PUBLICATIONS

Mengshi Hu et al.:"Threshold Based Sensing Measurement", doc.: IEEE 802.11-21/0351r5,May 10, 2021,total 19 pages.
(Continued)

*Primary Examiner* — Afshawn M Towfighi

(57) ABSTRACT

A communication method includes: A first device receives a plurality of NDPs from a second device, where one of the plurality of NDPs corresponds to one piece of CSI; and when a first condition is met, the first device sends first information to a third device, where the first information indicates that a CSI change degree exceeds a first threshold; and the first condition includes: a first CSI change degree in a plurality of CSI change degrees of the first device exceeds the first threshold, or a ratio of a quantity of CSI change degrees that exceed the first threshold in the plurality of CSI change degrees to the plurality of CSI change degrees is greater than a second threshold, where the plurality of CSI change degrees are determined based on pieces of CSI corresponding to the plurality of NDPs.

20 Claims, 14 Drawing Sheets

(56) References Cited

U.S. PATENT DOCUMENTS

| | | | |
|---|---|---|---|
| 2023/0132850 A1* | 5/2023 | Liu | G01S 13/003 |
| | | | 342/58 |
| 2024/0151845 A1* | 5/2024 | Feng | H04B 17/24 |

OTHER PUBLICATIONS

Mengshi Hu:"Threshold Based Sensing Measurement Follow up", doc.: IEEE 802.11-21/1069r1,2021.7.9,total 13 pages.

* cited by examiner

Third device     First device     Second device

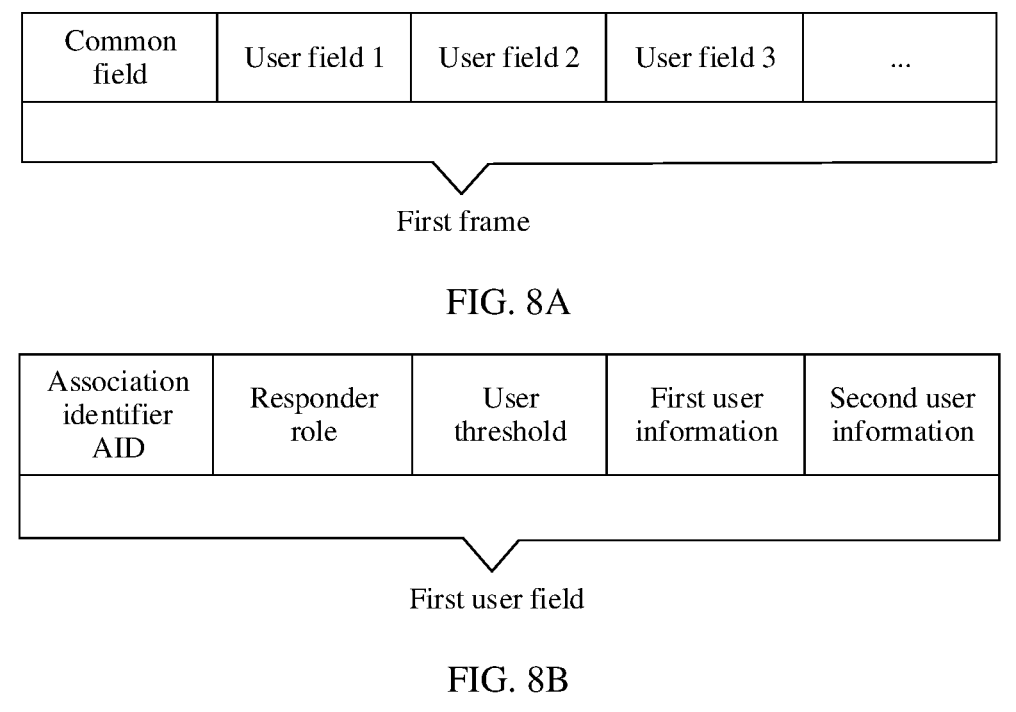

| Common field | User field 1 | User field 2 | User field 3 | ... |
|---|---|---|---|---|
| | | | | |

First frame

FIG. 8A

| Association identifier AID | Responder role | User threshold | First user information | Second user information |
|---|---|---|---|---|
| | | | | |

First user field

FIG. 8B

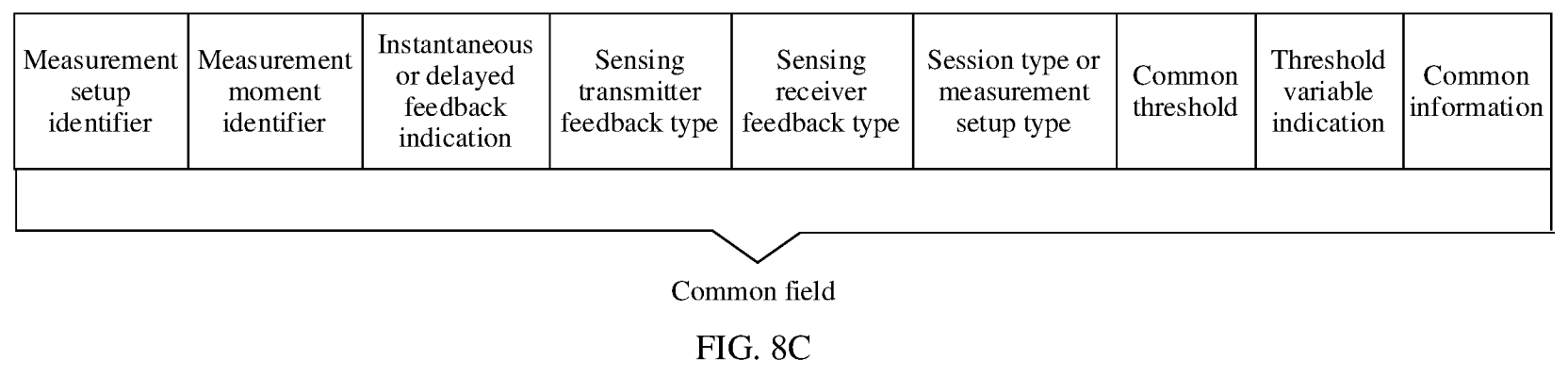

| Measurement setup identifier | Measurement moment identifier | Instantaneous or delayed feedback indication | Sensing transmitter feedback type | Sensing receiver feedback type | Session type or measurement setup type | Common threshold | Threshold variable indication | Common information |
|---|---|---|---|---|---|---|---|---|

Common field

FIG. 8C

COMMUNICATION METHOD AND APPARATUS FOR INDICATING CHANNEL STATE INFORMATION CHANGES

CROSS-REFERENCE TO RELATED APPLICATIONS

This application is a continuation of International Patent Application No. PCT/CN2022/111096, filed on Aug. 9, 2022, which claims priority to Chinese Patent Application No. 202110921247.7, filed on Aug. 11, 2021. The disclosures of the aforementioned applications are hereby incorporated by reference in their entireties.

TECHNICAL FIELD

This application relates to the field of communication technologies, and in particular, to a communication method and apparatus.

BACKGROUND

Wireless passive sensing (referred to as sensing below) is a technology in which a status of a target object can be sensed with no need to carry a signal source, for example, an electronic label.

Specifically, devices in a sensing process may include a sensing transmitter and a sensing receiver. The sensing transmitter may send a measurement signal, for example, a null data packet (NDP). Correspondingly, the sensing receiver may receive a measurement signal interfered by the target object, and determine channel state information (CSI) between a preset reference measurement signal and the measurement signal interfered by the target object. Specifically, the sensing transmitter may send two NDPs. Correspondingly, the sensing receiver may determine two pieces of CSI by using the two NDPs, and determine a CSI change degree by using the two pieces of CSI. The sensing transmitter sends a feedback request to the sensing receiver. If the sensing receiver determines that the CSI change degree meets a threshold condition, the sensing receiver may feed back that the CSI change degree meets the threshold condition to the sensing transmitter, that is, consider that the CSI change degree is large. If the sensing receiver determines that the CSI change degree does not meet the threshold condition, the sensing receiver may feed back that the CSI change degree does not meet the threshold condition to the sensing transmitter, that is, consider that the CSI change degree is small.

However, when the sensing receiver receives a plurality of NDPs, and the sensing receiver determines and obtains a plurality of CSI change degrees by using the plurality of NDPs, how the sensing receiver should feed back the CSI change degree to the sensing transmitter is a problem worth consideration.

SUMMARY

This application provides a communication method and apparatus, so that a first device feeds back, to a second device, a value of a CSI change degree based on a plurality of CSI change degrees, to implement effective sensing of a radio environment.

A first aspect of this application provides a communication method. The method includes:

A first device receives a plurality of NDPs from a second device, where one of the plurality of NDPs corresponds to one piece of CSI; and when a first condition is met, the first device sends first information to a third device, where the first information indicates that a CSI change degree exceeds a first threshold; and the first condition includes any one of the following: a first CSI change degree in a plurality of CSI change degrees of the first device exceeds the first threshold, and a ratio of a quantity of CSI change degrees that exceed the first threshold in the plurality of CSI change degrees to the plurality of CSI change degrees is greater than a second threshold. The plurality of CSI change degrees are determined based on pieces of CSI corresponding to the plurality of NDPs In the foregoing technical solution, for a case of the plurality of CSI change degrees of the first device, a plurality of possible conditions for feeding back, by the first device, the CSI change degree to the third device are provided, so that the first device feeds back a value of the CSI change degree to the third device for the plurality of CSI change degrees. The first device determines the plurality of CSI change degrees by using the plurality of NDPs, and feeds back the CSI change degree. This helps improve sensing precision. The first condition may be that the first CSI change degree in the plurality of CSI change degrees of the first device exceeds the first threshold. In other words, if one of the plurality of CSI change degrees exceeds the first threshold, the first device may report the first information to the second device, to indicate that the CSI change degree is large. In a sensing implementation process, the first device may timely report the CSI change degree, to implement effective sensing of a radio environment. Alternatively, the first condition may be that the ratio of the quantity of CSI change degrees that exceed the first threshold in the plurality of CSI change degrees to the plurality of CSI change degrees is greater than the second threshold. In other words, the first device may feed back the CSI change degree by using a proportion of the CSI change degrees that exceed the first threshold. Because the proportion of the CSI change degrees that exceed the first threshold exceeds a specific threshold, it may be understood that the radio environment has a large change. Therefore, the first device may timely report the CSI change degree, to implement effective sensing of the radio environment.

In a possible implementation, the second device and the third device are a same device, the first device is a sensing receiver, and the second device is a sensing transmitter.

The foregoing implementation shows some possible roles of the first device, the second device, and the third device in the sensing scenario. In this implementation, the second device and the third device are the same device. In other words, the sensing transmitter triggers the sensing receiver to feed back the value of the CSI change degree.

In another possible implementation, the first device is a first sensing receiver, the second device is a sensing transmitter, and the third device is a sensing initiator or a second sensing receiver.

The foregoing implementation shows other possible roles of the first device, the second device, and the third device in the sensing scenario. In this implementation, the third device may be the sensing initiator, and the sensing initiator may trigger the first sensing receiver to feed back the value of the CSI change degree, to learn of a change status of the radio environment. Alternatively, the third device may be the second sensing receiver, and the second sensing receiver triggers the first sensing receiver to feed back the value of the CSI change degree, to learn of a change status of the radio environment.

In another possible implementation, one of the plurality of CSI change degrees is calculated by the first device by using at least two pieces of CSI.

The foregoing implementation shows a possible calculation manner of the CSI change degree. The CSI change degree may be the CSI change degree calculated by using the at least two pieces of CSI. The value of the CSI change degree may indirectly represent a change status of the radio environment.

In another possible implementation, the method further includes: The first device determines the plurality of CSI change degrees by using the pieces of CSI corresponding to the plurality of NDPs. The foregoing implementation shows a possible implementation in which the first device obtains the plurality of CSI change degrees, so that the solution is more comprehensive.

In another possible implementation, the method further includes: The first device receives a feedback request from the third device, where the feedback request is used to trigger the first device to feed back a sensing measurement result.

In the foregoing implementation, the third device may trigger the first device to feed back the sensing measurement result. Therefore, the third device obtains the sensing measurement result, to learn of specific change information of the radio environment, and implement effective sensing of the radio environment.

In another possible implementation, the first CSI change degree is a maximum CSI change degree in the plurality of CSI change degrees. In this implementation, the first CSI change degree is the maximum CSI change degree, and the first device may compare the maximum CSI change degree with the first threshold, to feed back the value of the CSI change degree. Because the maximum CSI change degree may represent a change degree of the radio environment, the first device can properly and effectively feed back the CSI change degree based on the maximum CSI change degree, to improve sensing effectiveness and precision.

Alternatively, the first CSI change degree is calculated by the first device by using first CSI and second CSI; the first CSI is determined by the first device by using a first NDP, the first NDP is a last but (Y−1) null data packet (NDP) received by the first device, and Y is an integer greater than or equal to 1; and the second CSI is determined by the first device by using a pre-indicated NDP, or the second CSI is determined by the first device by using a $w^{th}$ NDP before the first NDP, and w is an integer greater than or equal to 1. Therefore, the first device may feed back the value of the CSI change degree based on a corresponding CSI change degree. This avoids a case in which the first device cannot feed back the CSI change degree because the CSI change degree cannot be timely calculated due to a hardware capability or a computing capability of the first device. The second CSI may be the CSI determined by the first device by using the pre-indicated NDP. Generally, CSI corresponding to the pre-indicated NDP is CSI in a static or common radio environment. Therefore, the CSI change degree determined by the first device by using the first CSI and the second CSI may represent a change status of the radio environment to some extent, to implement effective sensing. Alternatively, the second CSI is the CSI determined by the first device by using the $w^{th}$ NDP before the first NDP, and the CSI change degree determined by the first device by using the first CSI and the second CSI can timely track a change status of the radio environment, to properly feed back the value of the CSI change degree. For example, when the CSI change degree is small, the third device may be prevented from triggering the first device to feed back the sensing measurement result, thereby reducing resource overheads.

Alternatively, the first CSI change degree is calculated by the first device by using first CSI and CSI in a CSI set; the first CSI is determined by the first device by using a first NDP, the first NDP is a last but (Y−1) NDP received by the first device, and Y is an integer greater than or equal to 1; and the CSI set includes X pieces of CSI, the X pieces of CSI are respectively determined by the first device by using X NDPs before the first NDP, and X is an integer greater than or equal to 2. In this implementation, the first device calculates the first CSI change degree based on the first CSI and a plurality of pieces of CSI. In other words, the first device combines the plurality of pieces of CSI to represent the CSI change degree. This helps the third device sense a change status of the radio environment as a whole, to improve sensing effectiveness.

In another possible implementation, the method further includes: The first device sends the maximum CSI change degree in the plurality of CSI change degrees to the third device.

In this implementation, the maximum CSI change degree may represent a change degree of the radio environment. The first device feeds back the maximum CSI change degree. This helps the third device determine the value of the CSI change degree, to learn of a change of the radio environment.

In another possible implementation, an $i^{th}$ CSI change degree in the plurality of CSI change degrees is calculated by the first device by using an $(i+1)^{th}$ piece of CSI and an $i^{th}$ piece of CSI, the $(i+1)^{th}$ piece of CSI is determined by the first device by using an $(i+1)^{th}$ NDP received by the first device, the $i^{th}$ piece of CSI is determined by the first device by using an $i^{th}$ NDP received by the first device, and i is an integer greater than or equal to 1. In this implementation, the calculation manner of the CSI change degree is shown. The first device may calculate the CSI change degree by using adjacent CSI. In this way, the first device can learn of a change of the radio environment in real time, and this helps the first device properly feed back the value of the CSI change degree based on the plurality of CSI change degrees.

Alternatively, an $i^{th}$ CSI change degree is calculated by the first device by using an $(i+1)^{th}$ piece of CSI and the second CSI; the $(i+1)^{th}$ piece of CSI is determined by the first device by using an $(i+1)^{th}$ NDP received by the first device; and the second CSI is determined by the first device by using a pre-indicated NDP, or the second CSI is determined by the first device by using a $w^{th}$ NDP before a first NDP, the first NDP is a last but (Y−1) null data packet (NDP) received by the first device, Y is an integer greater than or equal to 1, w is an integer greater than or equal to 1, and i is an integer greater than or equal to 1. In this possible implementation, the second CSI may be determined by the first device by using the pre-indicated NDP. Generally, CSI corresponding to the pre-indicated NDP is CSI in a static or common radio environment. Therefore, the CSI change degree determined by the first device by using the $(i+1)^{th}$ piece of CSI and the second CSI may represent a change status of the radio environment to some extent, to implement effective sensing. Alternatively, the second CSI is the CSI determined by the first device by using the $w^{th}$ NDP before the first NDP, and the CSI change degree determined by the first device by using the first CSI and the second CSI can timely track a change status of the radio environment, to properly feed back the value of the CSI change degree.

Alternatively, an $i^{th}$ CSI change degree is calculated by the first device by using an $(i+1)^{th}$ piece of CSI and an $(i-Q)^{th}$ piece of CSI, the $(i+1)^{th}$ piece of CSI is determined by the first device by using an $(i+1)^{th}$ NDP received by the first device, the $(i-Q)^{th}$ piece of CSI is determined by the first device by using an $(i-Q)^{th}$ NDP received by the first device, i is an integer greater than or equal to 1, Q is an integer greater than or equal to 1, and i is greater than Q. In this implementation, the CSI change degree is calculated by the first device by using the $(i+1)^{th}$ piece of CSI and the $(i-Q)^{th}$ piece of CSI. This helps the first device learn of a change status of the radio environment in a period of time, to implement effective sensing and help the first device more properly feed back the value of the CSI change degree.

Alternatively, an $i^{th}$ CSI change degree is calculated by the first device by using an $(i+1)^{th}$ piece of CSI and Z pieces of CSI before the $(i+1)^{th}$ piece of CSI, the $(i+1)^{th}$ piece of CSI is determined by the first device by using an $(i+1)^{th}$ NDP received by the first device, the Z pieces of CSI before the $(i+1)^{th}$ piece of CSI are respectively determined by the first device by using Z NDPs before the $(i+1)^{th}$ NDP received by the first device, i is an integer greater than or equal to 1, and Z is an integer greater than or equal to 1. In this implementation, the first device calculates the CSI change degree based on the $(i+1)^{th}$ piece of CSI and the Z pieces of CSI before the $(i+1)^{th}$ piece of CSI. In other words, the first device combines the plurality of pieces of CSI to represent the CSI change degree. This helps the first device sense a change status of the radio environment as a whole, to improve sensing effectiveness.

In another possible implementation, the method further includes:

The first device receives first indication information from the second device or the third device, where the first indication information indicates Y, and Y is an integer greater than or equal to 1.

It can be learned that the first device receives the first indication information from the second device or the third device, to determine that the first NDP is the last but $(Y-1)$ NDP received by the first device. Therefore, the first device timely feeds back the value of the CSI change degree based on a corresponding CSI change degree. This avoids a case in which the first device cannot feed back the CSI change degree because the CSI change degree cannot be timely calculated due to a hardware capability or a computing capability of the first device.

In another possible implementation, the method further includes:

when the first condition is not met, the first device sends second information to the third device, where the second information indicates that the CSI change degree does not exceed the first threshold.

In the foregoing implementation, for a case in which the first condition is not met, the first device may feed back, to the third device, that the CSI change degree does not exceed the first threshold. This makes the solution more comprehensive.

In another possible implementation, the method further includes:

The first device receives at least one piece of the following information sent by the second device or the third device: second indication information and third indication information. The second indication information indicates a plurality of CSI change degree calculation manners used by the first device and/or indicates a multi-CSI change degree scenario or a single-CSI change degree scenario used by the first device. The third indication information indicates CSI that corresponds to a null data group NDP latest received by the first device and that is in pieces of CSI that participate in calculation of the plurality of CSI change degrees in the first device.

In the foregoing implementation, the first device may receive the indication information to determine some related indication information about calculation of the CSI change degree, so that the first device calculates the CSI change degree.

A second aspect of this application provides a communication method. The method includes:

When a first condition is met, a third device receives first information from a first device, where the first information indicates that a CSI change degree exceeds a first threshold; the first condition includes any one of the following: a first CSI change degree in a plurality of CSI change degrees of the first device exceeds the first threshold, and a ratio of a quantity of CSI change degrees that exceed the first threshold in the plurality of CSI change degrees to the plurality of CSI change degrees is greater than a second threshold; and the plurality of CSI change degrees are determined based on pieces of CSI corresponding to a plurality of NDPs, the plurality of NDPs are received by the first device from a second device, and one of the plurality of NDPs corresponds to one piece of CSI.

In the foregoing technical solution, for a case of the plurality of CSI change degrees of the first device, a plurality of possible conditions for feeding back, by the first device, the CSI change degree to the third device are provided, so that the first device feeds back a value of the CSI change degree to the third device for the plurality of CSI change degrees. The first device determines the plurality of CSI change degrees by using the plurality of NDPs. This helps improve sensing precision. The first condition may be that the first CSI change degree in the plurality of CSI change degrees of the first device exceeds the first threshold. In other words, if one of the plurality of CSI change degrees exceeds the first threshold, the first device may report the first information to the second device, to indicate that the CSI change degree is large. Therefore, in a sensing implementation process, the first device may timely report the CSI change degree, to implement effective sensing of a radio environment. Alternatively, the first condition may be that the ratio of the quantity of CSI change degrees that exceed the first threshold in the plurality of CSI change degrees to the plurality of CSI change degrees is greater than the second threshold. In other words, the first device may determine to report the first information by using a proportion of the CSI change degrees that exceed the first threshold. Because the proportion of the CSI change degrees that exceed the first threshold exceeds a specific threshold, it may be understood that the radio environment has a large change. Therefore, the first device may timely report the CSI change degree, so that the third device learns of the CSI change degree, to implement effective sensing of the radio environment.

In a possible implementation, the second device and the third device are a same device, the first device is a sensing receiver, and the second device is a sensing transmitter.

The foregoing implementation shows some possible roles of the first device, the second device, and the third device in the sensing scenario. In this implementation, the second device and the third device are the same device. In other words, the sensing transmitter triggers the sensing receiver to feed back the value of the CSI change degree.

In another possible implementation, the first device is a first sensing receiver, the second device is a sensing transmitter, and the third device is a sensing initiator or a second sensing receiver.

The foregoing implementation shows other possible roles of the first device, the second device, and the third device in the sensing scenario. In this implementation, the third device may be the sensing initiator, and the sensing initiator may trigger the first sensing receiver to feed back the value of the CSI change degree, to learn of a change status of the radio environment. Alternatively, the third device may be the second sensing receiver, and the second sensing receiver triggers the first sensing receiver to feed back the value of the CSI change degree, to learn of a change status of the radio environment.

In another possible implementation, one of the plurality of CSI change degrees is calculated by the first device by using at least two pieces of CSI.

The foregoing implementation shows a possible calculation manner of the CSI change degree. The CSI change degree may be the CSI change degree calculated by using the at least two pieces of CSI. The value of the CSI change degree may indirectly represent a change status of the radio environment.

In another possible implementation, the method further includes: The third device sends a feedback request to the first device, where the feedback request is used to trigger the first device to feed back a sensing measurement result.

In the foregoing implementation, the third device may trigger the first device to feed back the sensing measurement result. Therefore, the third device obtains the sensing measurement result, to learn of specific change information of the radio environment, and implement effective sensing of the radio environment.

In another possible implementation, the first CSI change degree is a maximum CSI change degree in the plurality of CSI change degrees. In this implementation, the first CSI change degree is the maximum CSI change degree, and the first device may compare the maximum CSI change degree with the first threshold, to feed back the value of the CSI change degree. Because the maximum CSI change degree may represent a change degree of the radio environment, the first device can properly and effectively feed back the CSI change degree based on the maximum CSI change degree, so that the third device learns of the CSI change degree, to implement effective sensing of the radio environment.

Alternatively, the first CSI change degree is calculated by the first device by using first CSI and second CSI; the first CSI is determined by the first device by using a first NDP, the first NDP is a last but (Y−1) null data packet (NDP) received by the first device, and Y is an integer greater than or equal to 1; and the second CSI is determined by the first device by using a pre-indicated NDP, or the second CSI is determined by the first device by using a $w^{th}$ NDP before the first NDP, and w is an integer greater than or equal to 1. Therefore, the first device timely feeds back the value of the CSI change degree based on a corresponding CSI change degree. This avoids a case in which the first device cannot accurately feed back the CSI change degree because the CSI change degree cannot be timely calculated due to a hardware capability or a computing capability of the first device. The second CSI may be the CSI determined by the first device by using the pre-indicated NDP. Generally, CSI corresponding to the pre-indicated NDP is CSI in a static or common radio environment. Therefore, the CSI change degree determined by the first device by using the first CSI and the second CSI may represent a change status of the radio environment to some extent, to implement effective sensing. Alternatively, the second CSI is the CSI determined by the first device by using the $w^{th}$ NDP before the first NDP, and the CSI change degree determined by the first device by using the first CSI and the second CSI can timely track a change status of the radio environment, to properly feed back the value of the CSI change degree. Therefore, the third device learns of the CSI change degree, to implement effective sensing of the radio environment. For example, when the CSI change degree is small, the third device may be prevented from triggering the first device to feed back the sensing measurement result, thereby reducing resource overheads.

Alternatively, the first CSI change degree is calculated by the first device by using first CSI and CSI in a CSI set; the first CSI is determined by the first device by using a first NDP, the first NDP is a last but (Y−1) NDP received by the first device, and Y is an integer greater than or equal to 1; and the CSI set includes X pieces of CSI, the X pieces of CSI are respectively determined by the first device by using X NDPs before the first NDP, and X is an integer greater than or equal to 2. In this implementation, the first device calculates the first CSI change degree based on the first CSI and a plurality of pieces of CSI. In other words, the first device combines the plurality of pieces of CSI to represent the CSI change degree. This helps the third device sense, by using the CSI change degree, a change status of the radio environment as a whole, to improve sensing effectiveness.

In another possible implementation, the method further includes:

The third device receives the maximum CSI change degree in the plurality of CSI change degrees from the first device.

In this implementation, the maximum CSI change degree may represent a change degree of the radio environment. The first device feeds back the maximum CSI change degree. This helps the third device determine the value of the CSI change degree, to learn of a change of the radio environment.

In another possible implementation, an $i^{th}$ CSI change degree in the plurality of CSI change degrees is calculated by the first device by using an $(i+1)^{th}$ piece of CSI and an $i^{th}$ piece of CSI, the $(i+1)^{th}$ piece of CSI is determined by the first device by using an $(i+1)^{th}$ NDP received by the first device, the $i^{th}$ piece of CSI is determined by the first device by using an $i^{th}$ NDP received by the first device, and i is an integer greater than or equal to 1. In this implementation, the calculation manner of the CSI change degree is shown. The first device may calculate the CSI change degree by using adjacent CSI. In this way, the first device can learn of a change of the radio environment in real time, and this helps the first device feed back the value of the CSI change degree based on the plurality of CSI change degrees, to implement real-time channel monitoring.

Alternatively, an $i^{th}$ CSI change degree is calculated by the first device by using an $(i+1)^{th}$ piece of CSI and the second CSI; the second CSI is determined by the first device by using a pre-indicated NDP, or the second CSI is determined by the first device by using a $w^{th}$ NDP before a first NDP, the first NDP is a last but (Y−1) null data packet (NDP) received by the first device, Y is an integer greater than or equal to 1, and w is an integer greater than or equal to 1; and the $(i+1)^{th}$ piece of CSI is determined by the first device by using an $(i+1)^{th}$ NDP received by the first device, and i is an integer greater than or equal to 1. In this possible implementation, the second CSI may be the CSI determined by the first device by using the pre-indicated NDP. Generally, CSI corresponding to the pre-indicated NDP is CSI in a static or common radio environment. Therefore, the CSI change degree determined by the first device by using the $(i+1)^{th}$ piece of CSI and the second CSI may represent a change status of the radio environment to some extent, to implement effective sensing. Alternatively, the second CSI is the CSI determined by the first device by using the $w^{th}$ NDP before the first NDP, and the CSI change degree determined by the first device by using the first CSI and the second CSI can timely track a change status of the radio environment, to properly feed back the value of the CSI change degree.

Alternatively, an $i^{th}$ CSI change degree is calculated by the first device by using an $(i+1)^{th}$ piece of CSI and an $(i-Q)^{th}$ piece of CSI, the $(i+1)^{th}$ piece of CSI is determined by the first device by using an $(i+1)^{th}$ NDP received by the first device, the $(i-Q)^{th}$ piece of CSI is determined by the first device by using an $(i-Q)^{th}$ NDP received by the first device, i is an integer greater than or equal to 1, Q is an integer greater than or equal to 1, and i is greater than Q. In this implementation, the CSI change degree is calculated by the first device by using the $(i+1)^{th}$ piece of CSI and the $(i-Q)^{th}$ piece of CSI. This helps the first device learn of a change status of the radio environment in a period of time, to implement effective sensing and help the first device more properly feed back the value of the CSI change degree.

Alternatively, an $i^{th}$ CSI change degree is calculated by the first device by using an $(i+1)^{th}$ piece of CSI and Z pieces of CSI before the $(i+1)^{th}$ piece of CSI, the $(i+1)^{th}$ piece of CSI is determined by the first device by using an $(i+1)^{th}$ NDP received by the first device, the Z pieces of CSI before the $(i+1)^{th}$ piece of CSI are respectively determined by the first device by using Z NDPs before the $(i+1)^{th}$ NDP received by the first device, i is an integer greater than or equal to 1, and Z is an integer greater than or equal to 1. In this implementation, the first device calculates the CSI change degree based on the $(i+1)^{th}$ piece of CSI and the Z pieces of CSI before the $(i+1)^{th}$ piece of CSI. In other words, the first device combines the plurality of pieces of CSI to represent the CSI change degree. This helps the first device sense a change status of the radio environment as a whole, to improve sensing effectiveness.

In another possible implementation, the method further includes:

The third device sends first indication information to the first device, where the first indication information indicates Y, and Y is an integer greater than or equal to 1.

It can be learned that the third device sends the first indication information to the first device, so that the first device determines that the first NDP is the last but (Y−1) NDP received by the first device. Therefore, the first device timely feeds back the value of the CSI change degree based on a corresponding CSI change degree. This avoids a case in which the first device cannot feed back the CSI change degree because the CSI change degree cannot be timely calculated due to a hardware capability or a computing capability of the first device.

In another possible implementation, the method further includes:

When the first condition is not met, the third device receives second information from the first device, where the second information indicates that the CSI change degree does not exceed the first threshold.

In the foregoing implementation, when the first condition is not met, the third device receives the second information from the first device, where the second information indicates that the CSI change degree does not exceed the first threshold, so that the solution is more comprehensive.

In another possible implementation, the method further includes:

The third device sends at least one piece of the following information to the first device: second indication information or third indication information.

The second indication information indicates a plurality of CSI change degree calculation manners used by the first device and/or indicates a multi-CSI change degree scenario or a single-CSI change degree scenario used by the first device The third indication information indicates CSI that corresponds to a null data group NDP latest received by the first device and that is in pieces of CSI that participate in calculation of the plurality of CSI change degrees in the first device.

In the foregoing implementation, the first device may receive the indication information to determine some related indication information about calculation of the CSI change degree, so that the first device calculates the CSI change degree.

A third aspect of this application provides a communication method. The method includes:

A sensing initiator generates a first frame, where the first frame is used to establish a first sensing session. The first frame includes at least one user field, the at least one user field includes a first user field, and the first user field includes one of the following indications: an association identifier, a responder role indication, a user threshold indication, first user information, and second user information. The first sensing session is a sensing session established between the sensing initiator and a sensing transmitter or a sensing receiver. The association identifier is an identifier of the sensing transmitter or the sensing receiver, and the association identifier identifies the first sensing session. The responder role indication indicates a role of the sensing transmitter or a role of the sensing receiver. The user threshold indication indicates a user level threshold used in a sensing process of the first sensing session. The first user information is user information that depends on a responder role. The second user information is user information that depends on a session type or a measurement setup type. The sensing initiator sends the first frame.

In the foregoing technical solution, the sensing initiator may initiate the first frame to establish the first sensing session. It can be learned from the related description of the first frame that, the first frame of the sensing initiator may indicate related information of the first sensing session, for example, the user level threshold and the role information of the device that are used in the sensing process of the first sensing session. It can be learned that, in the foregoing technical solution, setup of the sensing session and delivery of the related information of the sensing session can be implemented, so that the sensing transmitter or the sensing receiver obtains the related information of the sensing session, thereby facilitating execution of the sensing process.

In a possible implementation, the session type or the measurement setup type includes any one of the following: the sensing initiator is the sensing transmitter, the sensing initiator is the sensing receiver, and the sensing initiator is neither the sensing transmitter nor the sensing receiver.

The foregoing technical solution shows several possible implementations of the session type, and the session type of the sensing session is distinguished by using a role that may be played by the sensing initiator.

In another possible implementation, the first frame further includes a common field, and the common field includes at least one of the following: a measurement setup identifier, an instantaneous or delayed feedback indication, a sensing transmitter feedback type, a sensing receiver feedback type, a session type or a measurement setup type, a common threshold indication, and a threshold variable indication.

The measurement setup identifier indicates an identification number of one or more sensing sessions. The instantaneous or delayed feedback indication indicates an instantaneous feedback or delayed feedback of a sensing measurement result of one or more sensing sessions. The sensing transmitter feedback type includes at least one of the following: uncompressed channel state information (CSI), compressed CSI, a null data packet (NDP), a sensing measurement result, and a result of a CSI change degree. The sensing receiver feedback type includes at least one of: uncompressed channel state information (CSI), compressed CSI, a null data packet (NDP), a sensing measurement result, and a result of a CSI change degree. The session type or the measurement setup type includes any one of the following: the sensing initiator is the sensing transmitter, the sensing initiator is the sensing receiver, and the sensing initiator is neither the sensing transmitter nor the sensing receiver. The common threshold indication indicates a common threshold used in a sensing process of one or more sensing sessions. The threshold variable indication indicates whether a threshold used in a sensing process of one or more sensing sessions is variable.

In this possible implementation, the first frame further includes a common field, and the common field may include some parameters shared by one or more sensing sessions, so that the sensing initiator may send related information about the plurality of sensing sessions by using the common field, thereby improving efficiency of initiating the sensing session by the sensing initiator.

In another possible implementation, the method further includes: The sensing initiator sends first information, where the first information is used to update the threshold used in the sensing process of the first sensing session.

In this possible implementation, the sensing initiator may update the threshold used in the sensing process of the first sensing session, to modify the threshold used in the sensing process of the first sensing session, and improve flexibility of modifying the related information of the sensing session. The sensing initiator may dynamically modify the threshold based on an actual requirement and an actual transmission situation. Therefore, more effective sensing is implemented.

In another possible implementation, if the sensing initiator further plays the role of the sensing receiver, the first information is carried in a null data packet announcement (null data packet announcement, NDPA) or a feedback request.

Alternatively, if the sensing initiator further plays the role of the sensing receiver, the first information is carried in a feedback response.

Alternatively, if the sensing initiator is neither the sensing transmitter nor the sensing receiver, the first information is carried in a response frame, where the response frame is used by the sensing initiator to respond to the sensing transmitter or the sensing receiver and feed back the sensing measurement result of the first sensing session.

In the foregoing technical solution, a bearer carrier of the first information is provided based on the role of the sensing initiator. In this way, the current sensing process is adapted, and the message does not need to be redefined to send an updated threshold, thereby improving practicability of the solution.

In another possible implementation, the method further includes:

The sensing initiator sends first indication information, where the first indication information indicates that the sensing initiator is to send an update frame, and the update frame is used to update the threshold used in the sensing process of the first sensing session; and the sensing initiator sends the update frame.

In the foregoing technical solution, another manner of updating the threshold is provided. The sensing initiator may update the threshold by using the update frame, to dynamically modify the threshold. The sensing initiator may dynamically modify the threshold based on an actual requirement and an actual transmission situation. Therefore, more effective sensing is implemented.

In another possible implementation, the method further includes:

The sensing initiator sends at least one of the following: second indication information, third indication information, fourth indication information, fifth indication information, and sixth indication information.

The second indication information indicates whether the sensing initiator supports a threshold-based sensing process. The third indication information indicates that the sensing initiator supports to be roles/a role of the sensing initiator, the sensing responder, the sensing transmitter, and/or the sensing receiver. The fourth indication information indicates an initial threshold. The fifth indication information indicates whether the threshold used in the sensing process of the sensing session is variable. The sixth indication information indicates an instantaneous feedback or delayed feedback of the sensing measurement result of the sensing session.

In the foregoing technical solution, the sensing initiator may send the foregoing indication information to indicate some capability information (for example, information about whether the threshold-based sensing process is supported and the role that is supported to be) of the sensing initiator, so that another device in a system can learn of related information of the sensing initiator, and prepare for subsequent setup of the sensing session, to establish the sensing session more efficiently.

A fourth aspect of this application provides a communication method. The method includes:

A sensing transmitter or a sensing receiver receives a first frame from a sensing initiator, where the first frame is used to establish a first sensing session. The first frame includes at least one user field, the at least one user field includes a first user field, and the first user field includes one of the following indications: an association identifier, a responder role indication, a user threshold indication, first user information, and second user information. The first sensing session is a sensing session established between the sensing initiator and a sensing transmitter or a sensing receiver. The association identifier is an identifier of the sensing transmitter or the sensing receiver, and the association identifier identifies the first sensing session. The responder role indication indicates a role of the sensing transmitter or a role of the sensing receiver. The user threshold indication indicates a user level threshold used in a sensing process of the first sensing session. The first user information is user information that depends on a responder role. The second user information is user information that depends on a session type or a measurement setup type. The sensing transmitter or the sensing receiver determines information about the first sensing session based on the first frame.

In the foregoing technical solution, the sensing initiator may initiate the first frame to establish the first sensing session. It can be learned from the related description of the first frame that, the first frame of the sensing initiator may indicate related information of the first sensing session, for example, the user level threshold and the role information of the device that are used in the sensing process of the first sensing session. It can be learned that, in the foregoing technical solution, setup of the sensing session and sending of the related information of the sensing session can be implemented, so that the sensing transmitter or the sensing receiver obtains the related information of the first sensing session, thereby facilitating execution of the sensing process.

In a possible implementation, the session type or the measurement setup type includes any one of the following: the sensing initiator is the sensing transmitter, the sensing initiator is the sensing receiver, and the sensing initiator is neither the sensing transmitter nor the sensing receiver.

The foregoing technical solution shows several possible implementations of the session type, and the session type of the sensing session is distinguished by using a role that may be played by the sensing initiator.

In another possible implementation, the first frame further includes a common field, and the common field includes at least one of the following: a measurement setup identifier, an instantaneous or delayed feedback indication, a sensing transmitter feedback type, a sensing receiver feedback type, a session type or a measurement setup type, a common threshold indication, and a threshold variable indication.

The measurement setup identifier indicates an identification number of one or more sensing sessions. The instantaneous or delayed feedback indication indicates an instantaneous feedback or delayed feedback of a sensing measurement result of one or more sensing sessions. The sensing transmitter feedback type includes at least one of the following: uncompressed channel state information (CSI), compressed CSI, a null data packet (NDP), a sensing measurement result, and a result of a CSI change degree. The sensing receiver feedback type includes at least one of: uncompressed channel state information (CSI), compressed CSI, a null data packet (NDP), a sensing measurement result, and a result of a CSI change degree. The session type or the measurement setup type includes any one of the following: the sensing initiator is the sensing transmitter, the sensing initiator is the sensing receiver, and the sensing initiator is neither the sensing transmitter nor the sensing receiver. The common threshold indication indicates a common threshold used in a sensing process of one or more sensing sessions. The threshold variable indication indicates whether a threshold used in a sensing process of one or more sensing sessions is variable.

In this possible implementation, the first frame further includes a common field, and the common field may include some parameters shared by one or more sensing sessions, so that the sensing initiator may send related information about the plurality of sensing sessions by using the common field, thereby improving efficiency of initiating the sensing session by the sensing initiator.

In another possible implementation, the method further includes:

The sensing transmitter or the sensing receiver receives first information from the sensing initiator, where the first information is used to update the threshold used in the sensing process of the first sensing session.

The sensing transmitter or the sensing receiver determines an updated threshold based on the first information.

In this possible implementation, the sensing transmitter or the sensing receiver receives first information from the sensing initiator, where the first information is used to update the threshold used in the sensing process of the first sensing session, to modify the threshold used in the sensing process of the first sensing session, and improve flexibility of modifying the related information of the sensing session. The sensing initiator may dynamically modify the threshold based on an actual requirement and an actual transmission situation. Therefore, more effective sensing is implemented.

In another possible implementation, if the sensing initiator further plays the role of the sensing receiver, the first information is carried in an NDPA or a feedback request.

Alternatively, if the sensing initiator further plays the role of the sensing receiver, the first information is carried in a feedback response.

Alternatively, if the sensing initiator is neither the sensing transmitter nor the sensing receiver, the first information is carried in a response frame, where the response frame is used by the sensing initiator to respond to the sensing transmitter or the sensing receiver and feed back the sensing measurement result of the first sensing session.

In the foregoing technical solution, a bearer carrier of the first information is provided based on the role of the sensing initiator. In this way, the current sensing process is adapted, and the message does not need to be redefined to send an updated threshold, thereby improving practicability of the solution.

In another possible implementation, the method further includes:

The sensing transmitter or the sensing receiver receives first indication information from the sensing initiator, where the first indication information indicates that the sensing initiator is to send an update frame, and the update frame is used to update the threshold used in the sensing process of the first sensing session.

The sensing transmitter or the sensing receiver determines an updated threshold based on the first indication information.

The sensing transmitter or the sensing receiver receives the update frame from the sensing initiator.

The sensing transmitter or the sensing receiver determines an updated threshold based on the update frame.

In the foregoing technical solution, another manner of updating the threshold is provided. The sensing transmitter or the sensing receiver receives the update frame from the sensing initiator, to dynamically modify the threshold. The sensing initiator may dynamically modify the threshold based on an actual requirement and an actual transmission situation. Therefore, more effective sensing is implemented.

In another possible implementation, the method further includes:

The sensing transmitter or the sensing receiver receives at least one of the following from the sensing initiator: second indication information, third indication information, fourth indication information, fifth indication information, and sixth indication information.

The second indication information indicates whether the sensing initiator supports a threshold-based sensing process. The third indication information indicates that the sensing initiator supports to be roles/a role of the sensing initiator, the sensing responder, the sensing transmitter, and/or the sensing receiver. The fourth indication information indicates an initial threshold. The fifth indication information indicates whether the threshold used in the sensing process of the sensing session is variable. The sixth indication information indicates an instantaneous feedback or delayed feedback of the sensing measurement result of the sensing session.

In the foregoing technical solution, the sensing transmitter or the sensing receiver receives at least one of the following information from the sensing initiator: the second indication information, the third indication information, the fourth indication information, the fifth indication information, and the sixth indication information. The indication information indicates some capability information (for example, information about whether the threshold-based sensing process is supported and the role that is supported to be) of the sensing initiator, so that another device in a system can learn of related information of the sensing initiator, and prepare for subsequent setup of the sensing session, to establish the sensing session more efficiently.

A fifth aspect of this application provides a communication apparatus. The communication apparatus is configured to implement the foregoing methods. The communication apparatus may be the first device in the first aspect, or an apparatus including the first device, or an apparatus included in the first device, such as a chip. Alternatively, the communication apparatus may be the third device in the second aspect, or an apparatus including the third device, or an apparatus included in the third device. The communication apparatus includes a corresponding module, unit, or means (means) for implementing the foregoing method. The module, unit, or means may be implemented by hardware, software, or hardware executing corresponding software. The hardware or the software includes one or more modules or units corresponding to the foregoing functions.

A sixth aspect of this application provides a communication apparatus. The communication apparatus is configured to implement the foregoing methods. The communication apparatus may be the sensing initiator in the third aspect, or an apparatus including the sensing initiator, or an apparatus included in the sensing initiator, for example, a chip. Alternatively, the communication apparatus may be the sensing transmitter or the sensing receiver in the fourth aspect, or an apparatus including the sensing transmitter or the sensing receiver, or an apparatus included in the sensing transmitter or the sensing receiver. The communication apparatus includes a corresponding module, unit, or means (means) for implementing the foregoing method. The module, unit, or means may be implemented by hardware, software, or hardware executing corresponding software. The hardware or the software includes one or more modules or units corresponding to the foregoing functions.

A seventh aspect of this application provides a communication apparatus. The communication apparatus includes a processor and an interface circuit. The interface circuit is configured to communicate with a module other than the communication apparatus. The processor is configured to run a computer program or instructions to perform the method according to any one of the foregoing aspects. The communication apparatus may be the first device in the first aspect, or an apparatus including the first device, or an apparatus included in the first device, such as a chip. Alternatively, the communication apparatus may be the third device in the second aspect, or an apparatus including the third device, or an apparatus included in the third device. Alternatively, the communication apparatus may be the sensing initiator in the third aspect, or an apparatus including the sensing initiator, or an apparatus included in the sensing initiator. Alternatively, the communication apparatus may be the sensing transmitter or the sensing receiver in the fourth aspect, or an apparatus including the sensing transmitter or the sensing transmitter or the sensing receiver, or an apparatus included in the sensing transmitter or the sensing receiver.

Alternatively, the interface circuit may be a code/data read/write interface circuit. The interface circuit is configured to receive computer-executable instructions (the computer execution instructions are stored in the memory, and may be directly read from the memory, or may be read by using another component) and transmit the computer-executable instructions to the processor, so that the processor runs the computer-executable instructions to perform the method according to any one of the foregoing aspects.

In some possible designs, the communication apparatus may be a chip or a chip system.

An eighth aspect of this application provides a communication apparatus. The communication apparatus includes a processor. The processor is configured to: be coupled to a memory, and after reading instructions in the memory, perform the method according to any one of the foregoing aspects based on the instructions. The communication apparatus may be the first device in the first aspect, or an apparatus including the first device, or an apparatus included in the first device, such as a chip. Alternatively, the communication apparatus may be the third device in the second aspect, or an apparatus including the third device, or an apparatus included in the third device. Alternatively, the communication apparatus may be the sensing initiator in the third aspect, or an apparatus including the sensing initiator, or an apparatus included in the sensing initiator. Alternatively, the communication apparatus may be the sensing transmitter or the sensing receiver in the fourth aspect, or an apparatus including the sensing transmitter or the sensing receiver, or an apparatus included in the sensing transmitter or the sensing receiver.

A ninth aspect of this application provides a computer-readable storage medium. The computer-readable storage medium stores instructions. When the instructions are run on a communication apparatus, the communication apparatus is enabled to perform the method in any one of the foregoing aspects. The communication apparatus may be the first device in the first aspect, or an apparatus including the first device, or an apparatus included in the first device, such as a chip. Alternatively, the communication apparatus may be the third device in the second aspect, or an apparatus including the third device, or an apparatus included in the third device. Alternatively, the communication apparatus may be the sensing initiator in the third aspect, or an apparatus including the sensing initiator, or an apparatus included in the sensing initiator. Alternatively, the communication apparatus may be the sensing transmitter or the sensing receiver in the fourth aspect, or an apparatus including the sensing transmitter or the sensing receiver, or an apparatus included in the sensing transmitter or the sensing receiver.

A tenth aspect of this application provides a computer program product including instructions. When the computer program product runs on a communication apparatus, the communication apparatus is enabled to perform the method in any one of the foregoing aspects. The communication apparatus may be the first device in the first aspect, or an apparatus including the first device, or an apparatus included in the first device, such as a chip. Alternatively, the communication apparatus may be the third device in the second aspect, or an apparatus including the third device, or an apparatus included in the third device. Alternatively, the communication apparatus may be the sensing initiator in the third aspect, or an apparatus including the sensing initiator, or an apparatus included in the sensing initiator. Alternatively, the communication apparatus may be the sensing transmitter or the sensing receiver in the fourth aspect, or an apparatus including the sensing transmitter or the sensing receiver, or an apparatus included in the sensing transmitter or the sensing receiver.

An eleventh aspect of this application provides a communication apparatus (for example, the communication apparatus may be a chip or a chip system). The communication apparatus includes a processor, configured to implement the function in any one of the foregoing aspects. In a possible design, the communication apparatus further includes the memory, and the memory is configured to store necessary program instructions and data. When being a chip system, the communication apparatus may include a chip, or may include a chip and another discrete component.

A twelfth aspect of this application provides a communication system. The communication system includes the first device according to the first aspect and the third device according to the second aspect.

Alternatively, the communication system includes the sensing initiator according to the third aspect and the sensing transmitter or the sensing receiver according to the fourth aspect.

For technical effects brought by any one of design manners in the fifth aspect to the twelfth aspect, refer to technical effects brought by different design manners of the first aspect, the second aspect, the third aspect, or the fourth aspect.

According to the foregoing technical solutions, it can be learned that embodiments of this application have the following advantages:

It can be learned from the foregoing technical solution that the first device receives the plurality of NDPs from the second device, where one of the plurality of NDPs corresponds to one piece of CSI; when the first condition is met, the first device sends the first information to the third device, where the first information indicates that the CSI change degree exceeds the first threshold; and the first condition includes any one of the following: the first CSI change degree in the plurality of CSI change degrees of the first device exceeds the first threshold, and the ratio of the quantity of CSI change degrees that exceed the first threshold in the plurality of CSI change degrees to the plurality of CSI change degrees is greater than the second threshold. The plurality of CSI change degrees are determined based on the pieces of CSI corresponding to the plurality of NDPs It can be learned that, in the foregoing technical solution, when the first device determines the plurality of CSI change degrees by using the pieces of CSI corresponding to the plurality of NDPs, the first device feeds back the CSI change degree to the second device. When the first condition is met, the first device sends the first information to the third device, where the first information indicates that the CSI change degree exceeds the first threshold.

BRIEF DESCRIPTION OF DRAWINGS

FIG. 8A is a schematic diagram of a structure of an example first frame according to an embodiment of this application;

FIG. 8B is a schematic diagram of a structure of a first user field in an example first frame according to an embodiment of this application;

FIG. 8C is a schematic diagram of a structure of a common field in an example first frame according to an embodiment of this application;

DESCRIPTION OF EMBODIMENTS

Figure 1A:
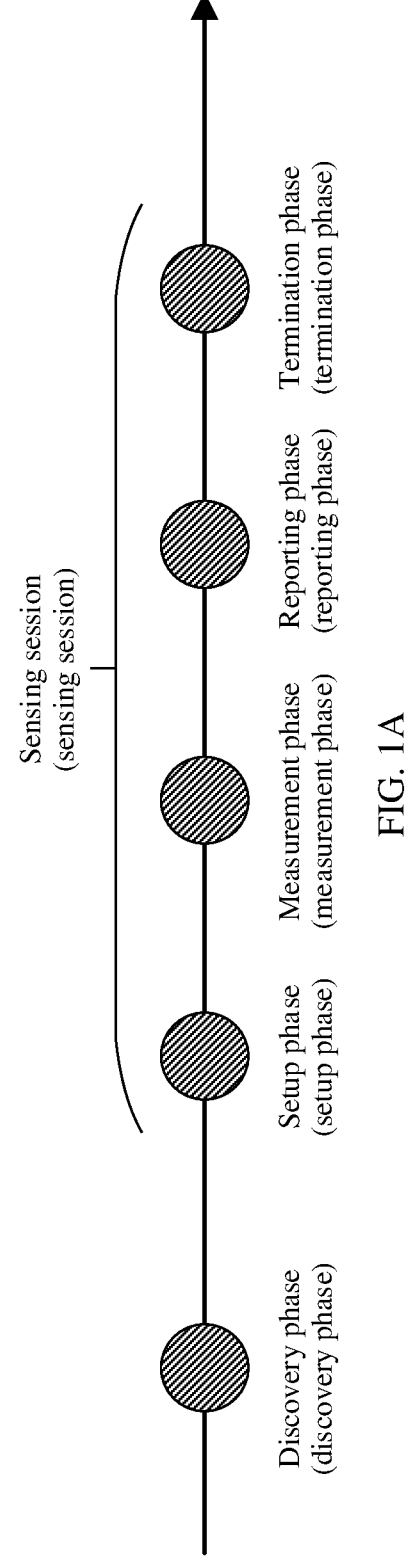
FIG. 1A is a schematic diagram of phases included in an example sensing process of a sensing session according to an embodiment of this application.

Embodiments of this application provide a communication method and apparatus, so that a first device sends first information to a third device when a first condition is met, where the first information indicates that a CSI change degree exceeds a first threshold.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Embodiments of this application may be applied to a wireless local area network (WLAN) scenario, and may be applied to an institute of electrical and electronics engineers (IEEE) 802.11 system standard, for example, 802.11a/b/g, 802.11n, 802.11ac, 802.11ax, or a next-generation standard of the institute of electrical and electronics engineers 802.11 system standard, for example, 802.11be or a further next-generation standard, or may be applied to 802.11bf. Alternatively, embodiments of this application may be applied to a wireless local area network system, for example, an internet of things (IoT) network or a vehicle-to-everything (Vehicle to X, V2X) network. It is clear that embodiments of this application may also be applied to another possible communication system, for example, an LTE system, an LTE frequency division duplex (FDD) system, an LTE time division duplex (TDD) system, a universal mobile telecommunications system (UMTS), a worldwide interoperability for microwave access (WiMAX) communication system, a 5th generation (5G) mobile communication system, and a future communication system.

The following describes some terms in embodiments of this application, to facilitate understanding of a person skilled in the art.

1. Wireless passive sensing: a technology that senses existence, action, and movement of an object based on impact of the object on a radio wave.

With development of a WLAN, a 4th generation (4G) mobile communication technology and communication technologies such as 5G, various wireless communication devices have been deployed in a large quantity in people's daily life. The wireless communication device may include a mobile phone, a computer, a wireless router, a smart home device, a wireless sensor, a wireless router, and the like. For example, there are usually several, dozens of, or even hundreds of wireless communication devices in a home environment, and these wireless communication devices are very close to objects such as a user and furniture in the home environment. In a process in which these wireless communication devices perform communication in a wireless manner, interference of a human body/object to a radio wave is sensed. Therefore, the human body/object may be sensed by using such interference. This is a working principle of the wireless passive sensing technology. Simply speaking, the wireless passive sensing technology uses a principle similar to a "human body radar" to sense the surrounding human body/object.

In a WLAN scenario, the wireless passive sensing technology may be a WLAN sensing technology. The following mainly describes an example in which embodiments of this application are applied to the WLAN scenario.

2. Sensing transmitter: a device that sends a signal used for sensing measurement in a sensing process. The sensing transmitter may also be referred to as a signal transmitter, a transmitter, or a main control node. The sensing transmitter may be a wireless access point (AP) or a station (STA).

3. Sensing receiver: a device that receives a signal used for sensing measurement in a sensing process and performs sensing measurement. The sensing receiver may also be referred to as a signal receiver, a receiver, or a measurement node. The sensing receiver may be an AP or a STA.

4. Sensing initiator: a device configured to establish a sensing session. The sensing initiator may be an AP or a STA.

5. Sensing responder: a device that participates in a sensing session initiated by a sensing initiator. The sensing responder may be an AP or a STA.

6. The STA in this embodiment of this application may be a user terminal, a user apparatus, an access apparatus, a subscriber station, a subscriber unit, a mobile station, a user agent, a user device, or another device that has a wireless communication function. The user terminal may be a device having a wireless communication function, for example, a handheld device, a vehicle-mounted device, a wearable device, a computing device, and another processing device connected to a wireless modem. The user terminal may alternatively be user equipment (UE), a mobile station (MS), a terminal, a terminal device (terminal equipment), a portable communication device, a handheld device, a portable computing device, an entertainment device, a game device or system, a global positioning system device, or any other suitable device in various forms configured to perform network communication via wireless media. For example, the STA may be a communication apparatus, a router, a switch, a bridge, or the like. Herein, for ease of description, the devices mentioned above are collectively referred to as a station or a STA.

7. The AP and the STA in embodiments of this application may be an AP and a STA that are applicable to an IEEE 802.11 system standard. The AP is an apparatus that is deployed in a wireless communication network and that provides a wireless communication function for a STA associated with the AP. The AP may be used as a center of the communication system, and is usually a network-side product that supports media access control (MAC) and a physical layer (physical, PHY) in the 802.11 system standard, for example, may be a communication device such as a base station, a router, a gateway, a repeater, a communication server, a switch, or a bridge. The base station may include a macro base station, a micro base station, a relay station, or the like in various forms. Herein, for ease of description, the devices mentioned above are collectively referred to as an AP. The STA is usually a terminal product that supports the MAC and the PHY of the 802.11 system standard, for example, a mobile phone or a notebook computer.

8. CSI is a channel measurement result obtained after the sensing receiver measures a training group sent by the sensing transmitter, and may be used to reflect a status of a (radio) channel of a link between the sensing receiver and the sensing transmitter.

In a WLAN protocol, channel state information is a CSI matrix that corresponds to each orthogonal frequency division multiplexing (OFDM) subcarrier group and that is obtained by performing measurement on the subcarrier group. A size of a full-dimension CSI matrix is a quantity of transmit antennas multiplied by a quantity of receive antennas, and each matrix element is a complex number including a real part and an imaginary part. When there are a large quantity of antennas and a large quantity of subcarriers, an overall data amount of uncompressed CSI is also large.

When measuring the channel, the transmitter includes training symbols in the training group. The sensing receiver performs channel measurement based on structures of these training symbols. Optionally, the training group may not include the training symbol.

The term "and/or" in this application describes an association relationship for describing associated objects and represents that one of three relationships may exist. For example, A and/or B may represent any one of the following three cases: Only A exists, both A and B exist, and only B exists. The character "/" generally indicates an "or" relationship between the associated objects.

"A plurality of" in this application means two or more. For example, a plurality of CSI change degrees include at least two CSI change degrees. "Exceed" in this application refers to "greater than", or "greater than or equal to". For example, that a CSI change degree exceeds a first threshold means that the CSI change degree is greater than the first threshold, or means that the CSI change degree is greater than or equal to the first threshold.

In addition, it should be understood that in description of this application, terms such as "first" and "second" are merely used for distinguishing and description, but should not be understood as indicating or implying relative importance, or should not be understood as indicating or implying a sequence.

First, a sensing process of a sensing session in this application is described. FIG. 1A shows phases included in the sensing process of the sensing session. As shown in FIG. 1A, the sensing process of the sensing session includes a setup phase, a measurement phase, a reporting phase, and a termination phase. A discovery phase is not a specific phase of all sensing processes of the sensing session. In the discovery phase, devices in a system are associated with each other, to be specific, the devices mainly exchange some sensing-related information. The setup phase is a phase for establishing the sensing session, and a sensing initiator initiates the sensing session in the setup phase. The measurement phase is a phase in which sensing measurement is performed. The reporting phase is a phase in which sensing reporting is performed. For the measurement phase and sensing measurement and sensing feedback in the measurement phase, refer to the following related description in FIG. 1B. The termination phase is a phase in which the sensing session is terminated.

In the example shown in FIG. 1A, one sensing session includes a setup phase, a measurement phase, a reporting phase, and a termination phase. These phases may occur once or more in one sensing session. The sensing session is initiated by a sensing initiator, and the sensing session is sensing interaction between the sensing initiator and another device. If the sensing initiator needs to interact with a plurality of devices, the sensing initiator may separately establish sensing sessions with the plurality of devices. In other words, the sensing initiator can establish a plurality of sensing sessions.

Figure 1B:
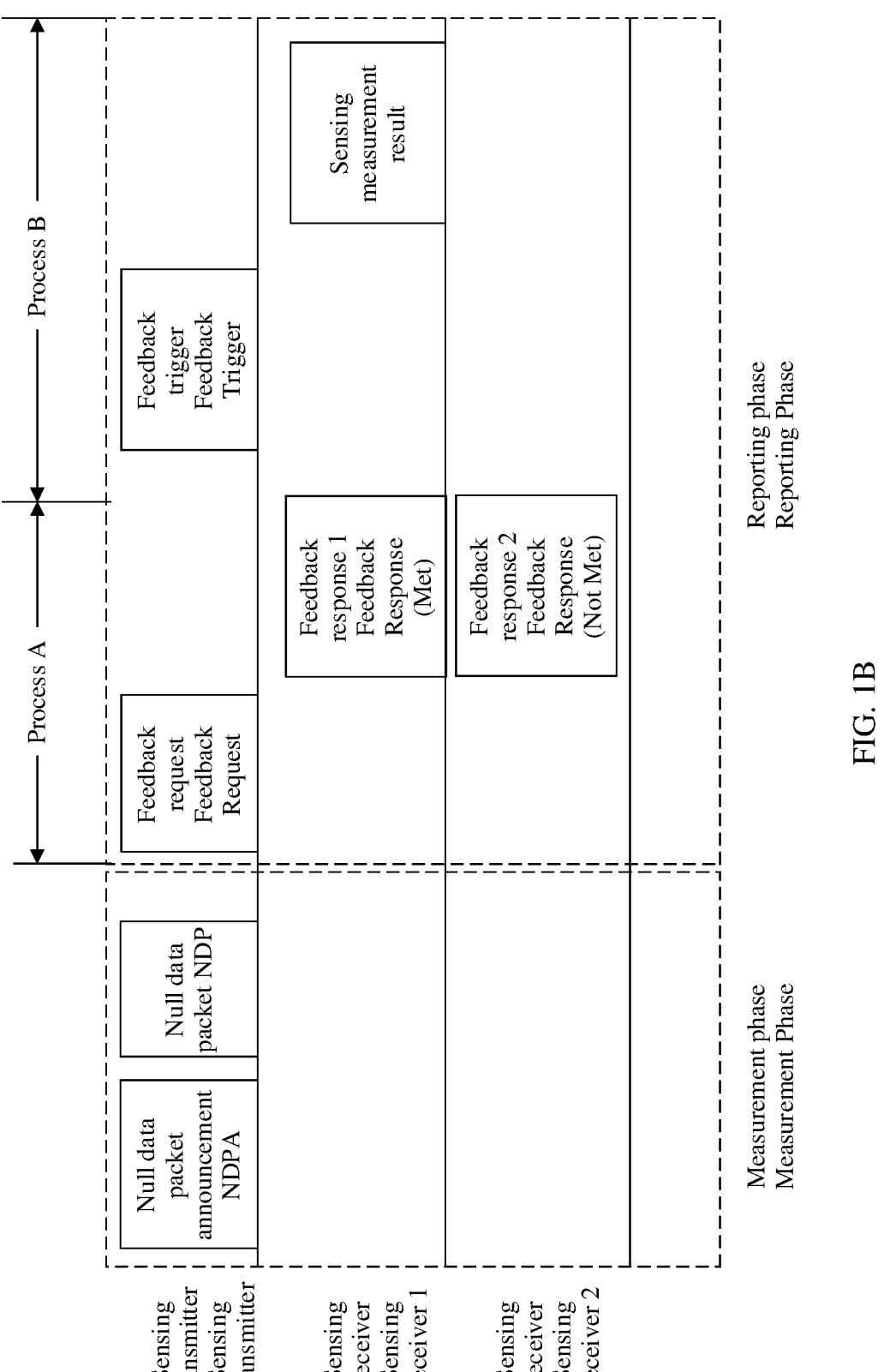
FIG. 1B is a schematic diagram of an example sensing process according to an embodiment of this application.

The following describes the sensing process with reference to FIG. 1B.

As shown in FIG. 1B, a sensing transmitter sends a feedback request, and a sensing receiver 1 determines a CSI change degree by using an NDP sent by the sensing transmitter. If the CSI change degree determined by the sensing receiver 1 meets a threshold condition, the sensing receiver 1 sends a feedback response 1, where the feedback response 1 includes met information, to indicate that the CSI change degree is large. A sensing receiver 2 determines a CSI change degree by using the NDP sent by the sensing transmitter. If the CSI change degree determined by the sensing receiver 2 does not meet the threshold condition, the sensing receiver 2 sends a feedback response 2, where feedback response 2 includes Not Met information, to indicate that the CSI change degree is small. In this way, if the sensing transmitter receives the feedback response 1, it may be determined that the CSI change degree measured by the sensing receiver 1 is large; and if the sensing transmitter receives the feedback response 2, it may be determined that the CSI change degree measured by the sensing receiver 2 is small.

It should be noted that, in the example shown in FIG. 1B, the technical solution of this application is described by using an example in which the sensing initiator is the sensing transmitter, and the sensing transmitter sends an NDPA and an NDP to implement sensing on a radio environment by the sensing receiver. A measurement process shown in FIG. 1B may be referred to as a non-trigger based (Non-TB) measurement process for short. If the sensing initiator is not the sensing transmitter, the sensing initiator may trigger the sensing transmitter to send the NDP, so that the sensing receiver can sense the radio environment. This is not specifically limited. Specifically, the sensing initiator may trigger the sensing transmitter to send the NDP in a manner such as triggering (Trigger) or polling. A measurement process in which the sensing initiator triggers the sensing transmitter to send the NDP, so that the sensing receiver can sense the radio environment may be referred to as a trigger based (TB) measurement process. The following describes the technical solutions of this application by using the non-trigger based measurement process as an example.

Figures 2, 3:
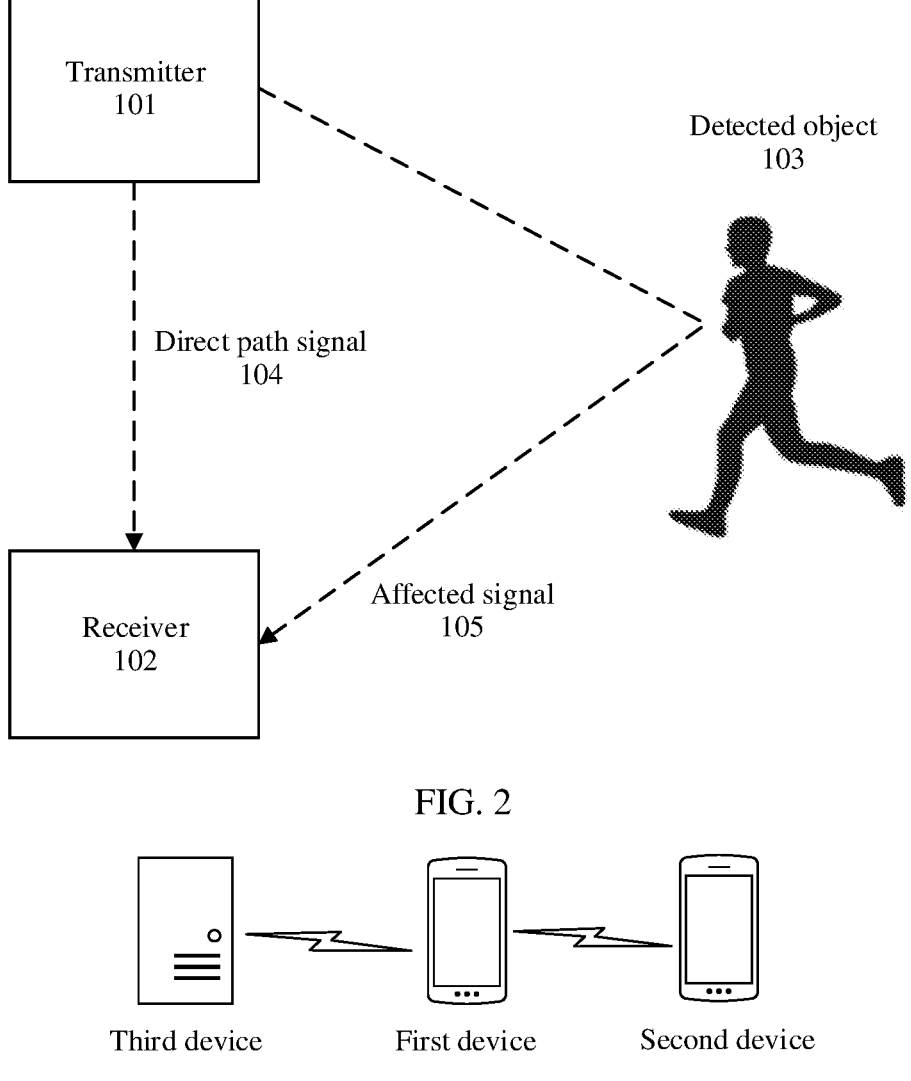
FIG. 2 is a schematic diagram of an example sensing system according to an embodiment of this application.
FIG. 3 is a schematic diagram of an example communication system according to an embodiment of this application.

FIG. 2 is a schematic diagram of a sensing system to which an embodiment of this application is applicable. As shown in FIG. 2, the sensing system includes one or more transmitters (for example, a transmitter 101 in FIG. 2) and one or more receivers (for example, a receiver 102 in FIG. 2). The transmitter and the receiver may be disposed in a same physical device, or may be disposed in different physical devices.

In a sensing process, the transmitter 101 sends a signal, and the receiver 102 receives the signal. The signal received by the receiver 102 may include a direct path signal 104 (a signal that is not affected by a detected object 103) and an affected signal 105 (a signal that is affected by the detected object 103). When the detected object 103 moves, the affected signal 105 changes. A superimposed radio signal of the direct path signal 104 received by the receiver 102 and the affected signal 105 also changes accordingly. In this way, the receiver 102 detects that a radio channel changes.

The radio channel is quantized into CSI, and the CSI may be used to reflect a status of the radio channel. The change of the radio channel is represented by changes of an amplitude and a phase of the CSI.

The receiver 102 may determine, based on two measurement results of the CSI and one threshold condition, a value of a CSI change degree, that is, a value of a channel change degree. For example, when the CSI change degree meets the threshold condition, the receiver 102 determines that the CSI change degree is large. When the CSI change degree does not meet the threshold condition, the receiver 102 determines that the CSI change degree is small. When the CSI change degree is large, the transmitter 101 may further interact with the receiver 102 to implement more accurate sensing.

Compared with wearable devices such as a camera or a wristband, wireless passive sensing does not need additional hardware costs and a user do not need to wear a device. This facilitates monitoring of elderly people and children and can detect possible thief intrusions, and the like. In addition, the wireless passive sensing technology has little impact on user privacy and can monitor areas such as a bedroom and a bathroom, to implement more comprehensive protection. In addition, the wireless passive sensing technology can also perform effective sensing under conditions such as poor light and shelter existence (such as a curtain and wooden furniture), and can also sense several rooms across walls. In addition, the wireless passive sensing technology has high sensing precision, and can perform monitoring such as gesture recognition, breathing sleep, and the like.

For ease of understanding the technical solutions in embodiments of this application, the following is a schematic diagram of a communication system according to an embodiment of this application. FIG. 3 is a schematic diagram of an example communication system according to an embodiment of this application. As shown in FIG. 3, the communication system includes at least two devices, such as a first device, a second device, and a third device.

In a possible implementation, the second device and the third device are a same device, the first device may be a sensing receiver, and the second device may be a sensing transmitter. In this implementation, optionally, the second device may also be a sensing initiator.

In another possible implementation, the first device may be a first sensing receiver, the second device may be a sensing transmitter, and the third device may be a second sensing receiver or a sensing initiator. Any device in the communication system may be a network device or a terminal device. This is not limited herein.

The network device is a device that is located on a network side of the communication system and that has a wireless transceiver function, or a chip or a chip system that can be disposed in the device. The network device includes but is not limited to: an access point (AP) in a wireless fidelity (Wi-Fi) system, such as a home gateway, a router, a server, a switch, and a bridge, an evolved NodeB (eNB), a radio network controller (radio network controller, RNC), a NodeB (NB), a base station controller (base station controller, BSC), a base transceiver station (BTS), a home base station (for example, a home evolved NodeB, or a home NodeB, HNB), a baseband unit (BBU), a wireless relay node, a wireless backhaul node, a transmission point (transmission reception point, TRP; or transmission point, TP), or the like. The network device may alternatively be a gNB or a transmission point (TRP or TP) in a 5G system, for example, a new radio (new radio, NR) system, or one antenna panel or a group of antenna panels (including a plurality of antenna panels) of a base station in a 5G system. The network device may alternatively be a network node, such as a baseband unit (BBU), a distributed unit (DU), or a road side unit (RSU) having a base station function, that constitutes a gNB or a transmission point.

The terminal device is a terminal accessing the communication system and having wireless sending and receiving functions, or a chip or a chip system that can be disposed in the terminal. The terminal device may also be referred to as a user apparatus, an access terminal, a subscriber unit, a subscriber station, a mobile station, a remote station, a station, a remote terminal, a mobile device, a user terminal, a terminal, a wireless communication device, a user agent, or a user apparatus. The terminal device in embodiments of this application may be a mobile phone, a tablet computer (Pad), a computer having wireless sending and receiving functions, a virtual reality (VR) terminal device, an augmented reality (AR) terminal device, a wireless terminal in industrial control (industrial control), a wireless terminal in self driving, a wireless terminal in telemedicine (remote medical), a wireless terminal in a smart grid, a wireless terminal in transportation safety, a wireless terminal in a smart city, a wireless terminal in a smart home, a vehicle-mounted terminal, an RSU that has a terminal function, or the like.

It should be noted that, the solutions in embodiments of this application may also be used in another communication system, and a corresponding name may also be replaced with a name of a corresponding function in the another communication system.

It should be understood that FIG. 3 is only a simplified schematic diagram of an example of the communication system for ease of understanding. The communication system may further include other network devices and/or other terminal devices that are not shown in FIG. 3.

The following describes the technical solution in this application with reference to specific embodiments.

Figure 4:
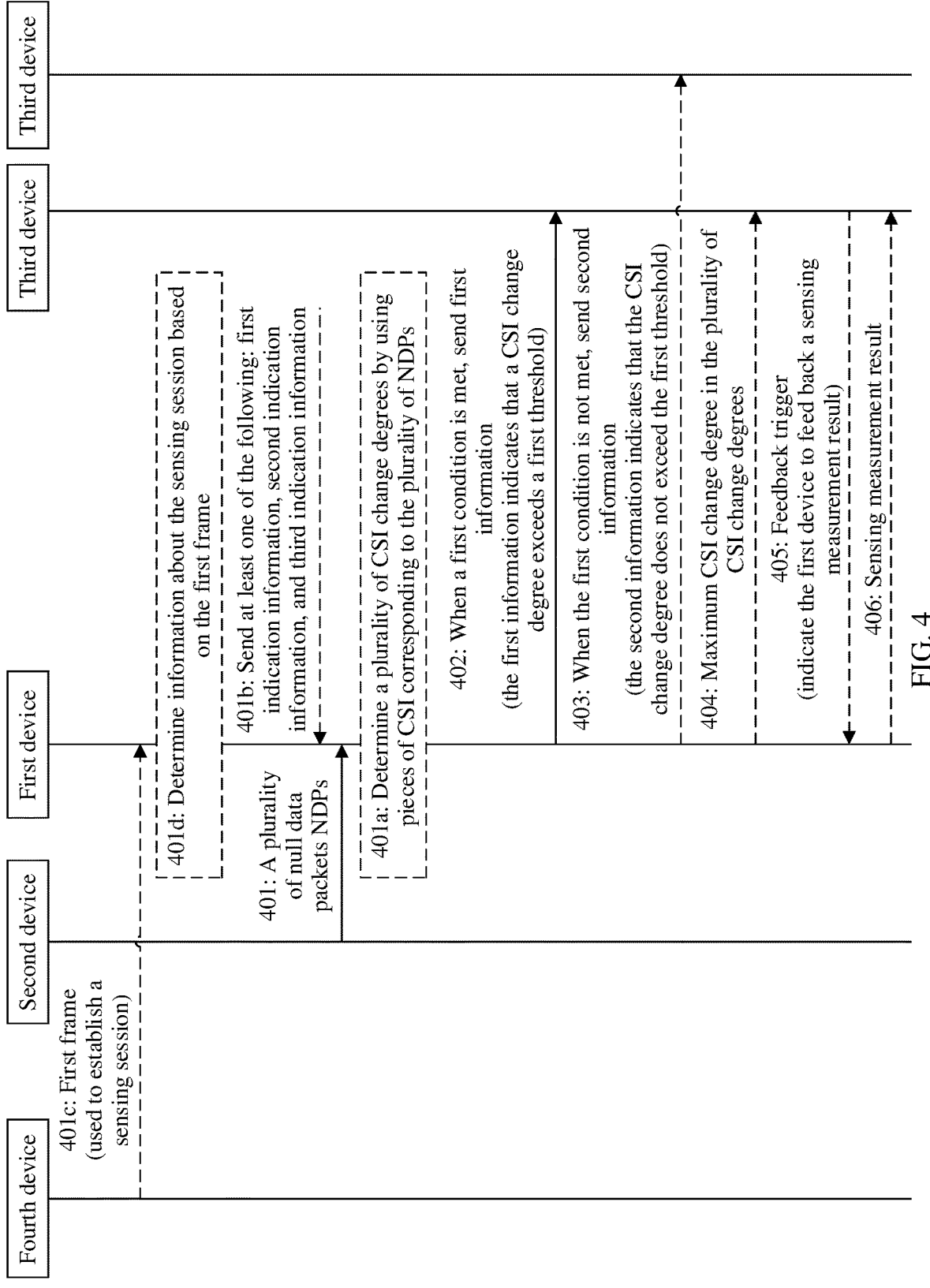
FIG. 4 is a schematic diagram of an example communication method according to an embodiment of this application.

FIG. 4 is a schematic diagram of an example communication method according to an embodiment of this application. As shown in FIG. 4, the communication method includes the following steps.

401: A second device sends a plurality of NDPs to a first device. Correspondingly, the first device receives the plurality of NDPs from the second device.

One of the plurality of NDPs corresponds to one piece of CSI. The first device is a sensing receiver, and the second device is a sensing transmitter. Optionally, the plurality of NDPs include at least three NDPs.

Specifically, the second device obtains, by measuring the plurality of NDPs, pieces of CSI corresponding to the plurality of NDPs.

Figure 5A:
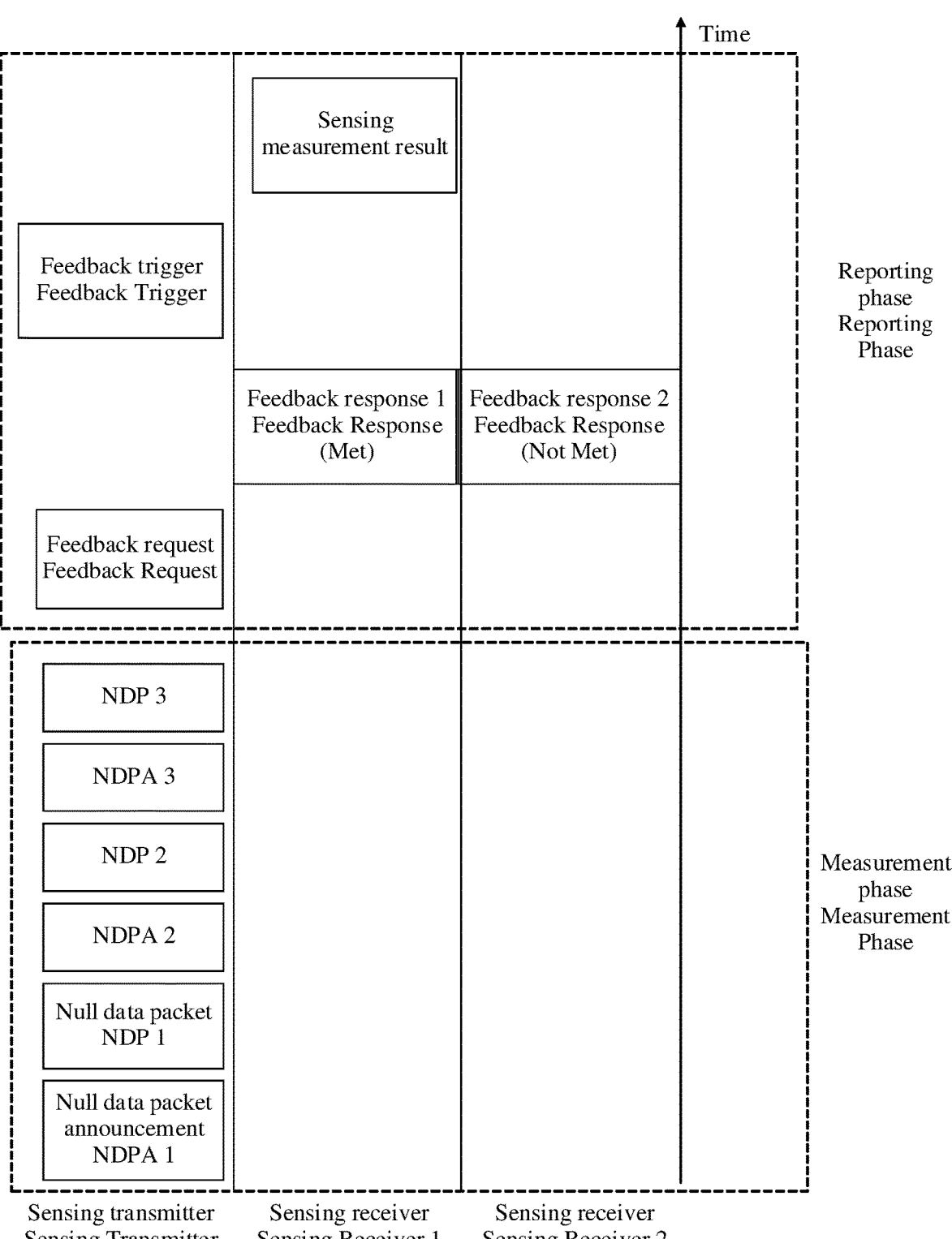
FIG. 5A is a schematic diagram of a sensing process of an example communication method according to an embodiment of this application.

For example, as shown in FIG. 5A, the plurality of NDPs include an NDP 1, an NDP 2, and an NDP 3. A sensing receiver 1 may separately measure the NDP 1, the NDP 2, and the NDP 3, to obtain CSI 1 corresponding to the NDP 1, CSI 2 corresponding to the NDP 2, and CSI 3 corresponding to the NDP 3.

Figure 5B:
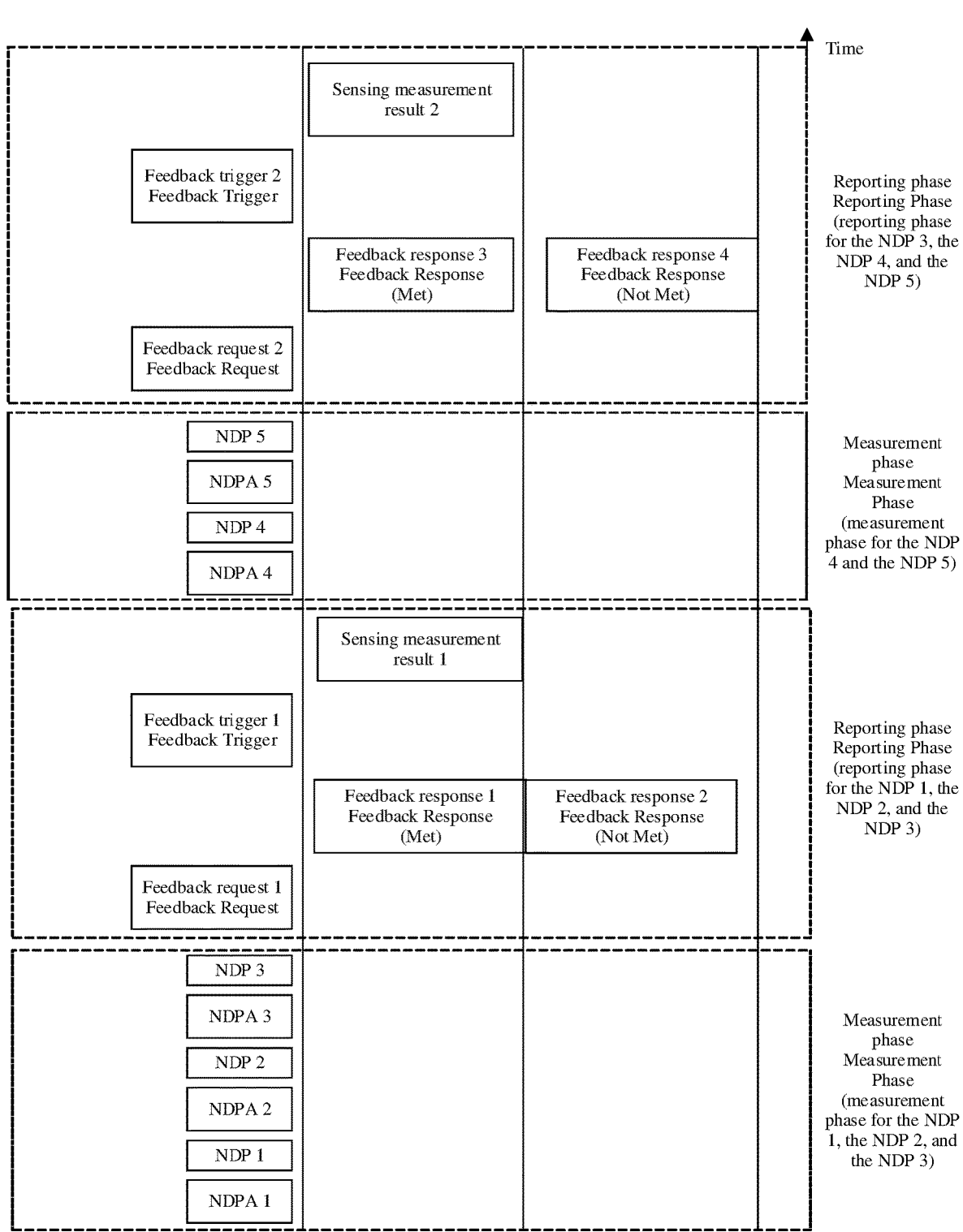
FIG. 5B is another schematic diagram of a sensing process of an example communication method according to an embodiment of this application.

For example, as shown in FIG. 5B, the plurality of NDPs include an NDP 3, an NDP 4, and an NDP 5. A sensing receiver 1 may separately measure the NDP 3, the NDP 4, and the NDP 5, to obtain CSI 3 corresponding to the NDP 3, CSI 4 corresponding to the NDP 4, and CSI 5 corresponding to the NDP 5.

Optionally, the embodiment shown in FIG. 4 further includes step 401a. Step 401a may be performed before step 402.

401a: The first device determines a plurality of CSI change degrees by using the pieces of CSI corresponding to the plurality of NDPs.

One of the plurality of CSI change degrees is calculated by the first device by using at least two pieces of CSI. The plurality of CSI change degrees include at least two CSI change degrees.

The following describes some possible calculation manners of the CSI change degree in the plurality of CSI change degrees.

Manner 1: An $i^{th}$ CSI change degree in the plurality of CSI change degrees is calculated by the first device by using an $(i+1)^{th}$ piece of CSI and an $i^{th}$ piece of CSI, and i is an integer greater than or equal to 1.

The $(i+1)^{th}$ piece of CSI is determined by the first device by using an $(i+1)^{th}$ NDP received by the first device. The $i^{th}$ piece of CSI is determined by the first device by using an $i^{th}$ NDP received by the first device.

For example, as shown in FIG. 5A, the sensing receiver may separately measure an NDP 1, an NDP 2, and an NDP 3, to obtain CSI 1 corresponding to the NDP 1, CSI 2 corresponding to the NDP 2, and CSI 3 corresponding to the NDP 3. Therefore, the plurality of CSI change degrees include two CSI change degrees. A 1st CSI change degree is calculated by the sensing receiver by using the CSI 1 and the CSI 2. A 2nd CSI change degree is calculated by the sensing receiver by using the CSI 2 and the CSI 3.

Manner 2: An $i^{th}$ CSI change degree in the plurality of CSI change degrees is calculated by the first device by using an $(i+1)^{th}$ piece of CSI and second CSI, and i is an integer greater than or equal to 1.

The $(i+1)^{th}$ piece of CSI is determined by the first device by using an $(i+1)^{th}$ NDP received by the first device.

The second CSI is determined by the first device by using a pre-indicated NDP, or the second CSI is determined by the first device by using a $w^{th}$ NDP before a first NDP, the first NDP is a last but $(Y-1)$ NDP received by the first device, Y is an integer greater than or equal to 1, and w is an integer greater than or equal to 1.

For example, as shown in FIG. 5A, the first device is a sensing receiver 1, and the sensing receiver 1 may separately measure an NDP 1, an NDP 2, and an NDP 3, to obtain CSI 1 corresponding to the NDP 1, CSI 2 corresponding to the NDP 2, and CSI 3 corresponding to the NDP 3.

Optionally, the first NDP is a last one NDP received by the sensing receiver 1, the first NDP is the NDP 3, and w is 1. Therefore, the second CSI is the CSI 2 determined by the sensing receiver 1 by using the NDP 2. Therefore, the plurality of CSI change degrees include two CSI change degrees. A 1st CSI change degree is calculated by the sensing receiver 1 by using the CSI 1 and the CSI 2. A 2nd CSI change degree is calculated by the sensing receiver 1 by using the CSI 2 and the CSI 3.

For example, as shown in FIG. 5B, the first device is a sensing receiver 1, and the sensing receiver 1 may separately measure an NDP 3, an NDP 4, and an NDP 5, to obtain CSI 3 corresponding to the NDP 3, CSI 4 corresponding to the NDP 4, and CSI 5 corresponding to the NSP 5. Optionally, the first NDP is a pre-indicated NDP. For example, the first NDP is the NDP 3, and the second CSI is the CSI 3 determined by the sensing receiver 1 by using the NDP 3. Therefore, the plurality of CSI change degrees include two CSI change degrees. A $1^{st}$ CSI change degree is calculated by the sensing receiver 1 by using the CSI 4 and the CSI 3. A $2^{nd}$ CSI change degree is calculated by the sensing receiver 1 by using the CSI 5 and the CSI 3.

Manner 3: An $i^{th}$ CSI change degree is calculated by the first device by using an $(i+1)^{th}$ piece of CSI and an $(i-Q)^{th}$ piece of CSI, the $(i+1)^{th}$ piece of CSI is determined by the first device by using an $(i+1)^{th}$ NDP received by the first device, the $(i-Q)^{th}$ piece of CSI is determined by the first device by using an $(i-Q)^{th}$ NDP received by the first device, i is an integer greater than or equal to 1, Q is an integer greater than or equal to 1, and i is greater than Q.

Figure 5C:
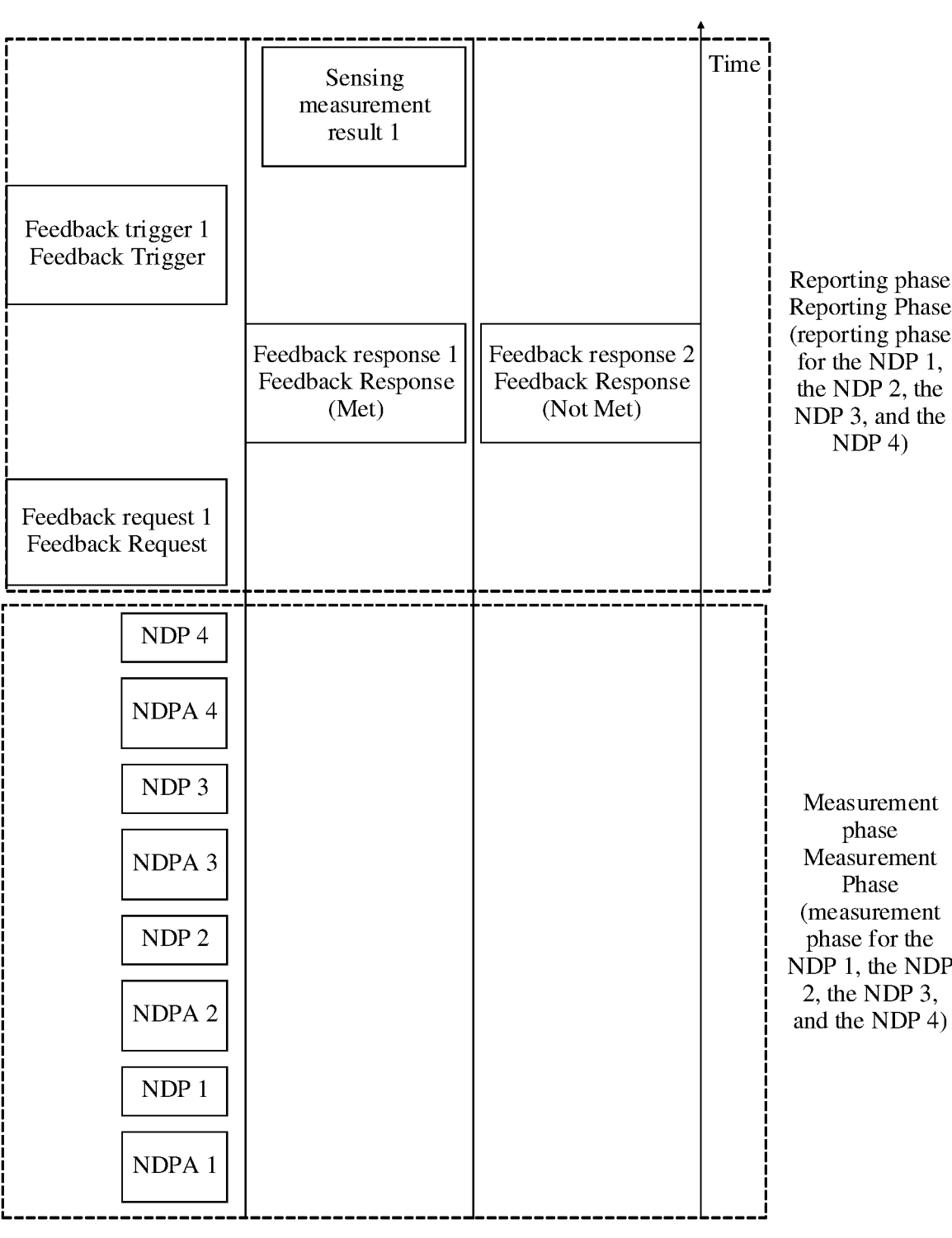
FIG. 5C is another schematic diagram of a sensing process of an example communication method according to an embodiment of this application.

For example, as shown in FIG. 5C, the first device is a sensing receiver 1, and the sensing receiver 1 may separately measure an NDP 1, an NDP 2, an NDP 3, and an NDP 4, to obtain CSI 1 corresponding to the NDP 1, CSI 2 corresponding to the NDP 2, CSI 3 corresponding to the NDP 3, and CSI 4 corresponding to the NDP 4. Q=2. Therefore, it can be learned that the plurality of CSI change degrees include two CSI change degrees. A $1^{st}$ CSI change degree is calculated by the sensing receiver 1 by using the CSI 3 and the CSI 1. A $2^{nd}$ CSI change degree is calculated by the sensing receiver 1 by using the CSI 4 and the CSI 2.

Manner 4: An $i^{th}$ CSI change degree is calculated by the first device by using an $(i+1)^{th}$ piece of CSI and Z pieces of CSI before the $(i+1)^{th}$ piece of CSI, the $(i+1)^{th}$ piece of CSI is determined by the first device by using an $(i+1)^{th}$ NDP received by the first device, the Z pieces of CSI before the $(i+1)^{th}$ piece of CSI are respectively determined by the first device by using Z NDPs before the $(i+1)^{th}$ NDP received by the first device, i is an integer greater than or equal to 1, and Z is an integer greater than or equal to 1.

For example, as shown in FIG. 5C, the first device is a sensing receiver 1, and the sensing receiver 1 may separately measure an NDP 1, an NDP 2, an NDP 3, and an NDP 4, to obtain CSI 1 corresponding to the NDP 1, CSI 2 corresponding to the NDP 2, CSI 3 corresponding to the NDP 3, and CSI 4 corresponding to the NDP 4. Z=2. Therefore, it can be learned that the plurality of CSI change degrees include four CSI change degrees. The sensing receiver 1 calculates a $1^{st}$ CSI change degree by using the CSI 3 and the CSI 1. The sensing receiver 1 calculates a $2^{nd}$ CSI change degree by using the CSI 3 and the CSI 2. The sensing receiver 1 calculates a $3^{rd}$ CSI change degree by using the CSI 4 and the CSI 2. The sensing receiver 1 calculates a $4^{th}$ CSI change degree by using the CSI 4 and the CSI 3.

It should be noted that, optionally, there may be a specific time offset between a moment at which the first device determines a CSI change degree between CSI corresponding to one NDP and other CSI and a moment at which the first device receives the NDP. For example, the NDP may be a last but $(Y-1)$ NDP received by the first device. Y is an integer greater than or equal to 1. When Y=1, it indicates that there is no time offset. When Y=2, it indicates that receive time of one NDP is offset.

For example, as shown in FIG. 5C, a sensing receiver 1 calculates a CSI change degree by using CSI 3 corresponding to an NDP 3 and CSI 2 corresponding to an NDP 2. In this case, the sensing receiver 1 receives an NDP 4. The NDP 3 is a last but one NDP received by the sensing receiver 1. The NDP 4 is a last one NDP received by the sensing receiver 1. In other words, receive time of one NDP may be used as time in which the first device calculates the CSI change degree by using the CSI 3 corresponding to the NDP 3 and the CSI 2 corresponding to the NDP 2. Therefore, it is ensured that the first device can calculate the CSI change degree by using the CSI 3 corresponding to the NDP 3 and the CSI 2 corresponding to the NDP 2.

In some implementations, step 401 and step 401a may be performed in the measurement phase or a time interval between the measurement phase and the reporting phase of the sensing process shown in FIG. 1A.

402: When a first condition is met, the first device sends first information to a third device. The first information indicates that a CSI change degree exceeds a first threshold. Correspondingly, when the first condition is met, the third device receives the first information from the first device.

Optionally, a value of the first threshold may be determined by the first device. Specifically, the first device may set the first threshold based on a sensing measurement result fed back by the third device, an environment change status, and the like. For example, the sensing initiator may indicate a low threshold as an initial threshold for the first device. In the feedback process, the first device may adjust the initial threshold based on the fed-back sensing measurement result, the environment change status, and the like, to obtain the first threshold.

The following describes several possible implementations of roles that are played by the first device, the second device, and the third device in the sensing process.

Figure 6A:
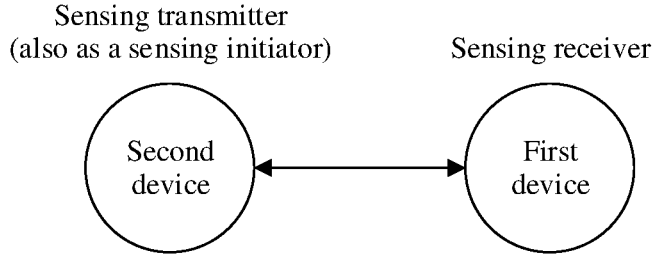
FIG. 6A is a schematic diagram of example roles of a first device, a second device, and a third device according to an embodiment of this application.

1. The second device and the third device are a same device, the first device is a sensing receiver, the second device is a sensing transmitter, and the second device further plays a role of a sensing initiator. As shown in FIG. 6A, the second device serves as the sensing initiator to initiate a sensing session, and the second device serves as the sensing transmitter to send a plurality of NDPs to the first device (the sensing receiver). The second device serves as the sensing initiator to trigger the first device to feed back a value of a CSI change degree.

Figure 6B:
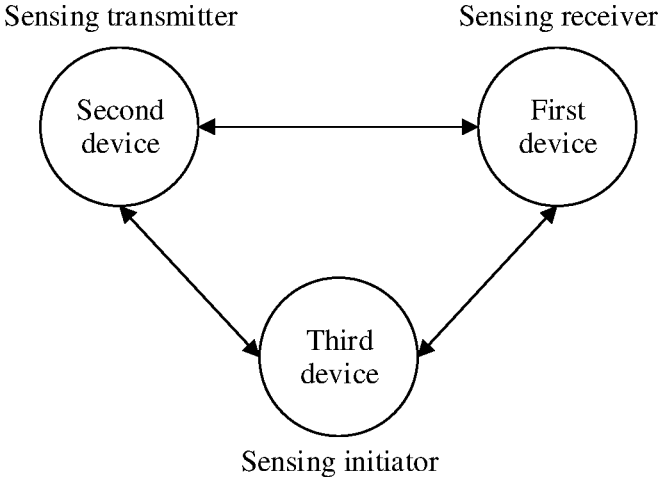
FIG. 6B is another schematic diagram of example roles of a first device, a second device, and a third device according to an embodiment of this application.

2. The first device is a sensing receiver, the second device is a sensing transmitter, and the third device is a sensing initiator. For example, as shown in FIG. 6B, the third device serves as the sensing initiator to initiate a sensing session, and the second device serves as the sensing transmitter to send a plurality of NDPs to the first device (the sensing receiver). The third device serves as the sensing initiator to trigger the first device to feed back a value of a CSI change degree.

Figure 6C:
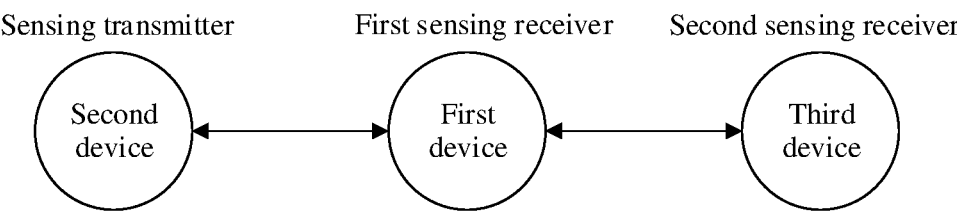
FIG. 6C is another schematic diagram of example roles of a first device, a second device, and a third device according to an embodiment of this application.

3. The first device is a first sensing receiver, the second device is a sensing transmitter, and the third device is a second sensing receiver. For example, as shown in FIG. 6C, the second device serves as the sensing transmitter to send a plurality of NDPs to the first device (the first sensing receiver). However, another sensing receiver (the second sensing receiver) in a system triggers the first device to feed back a value of a CSI change degree.

It should be noted that FIG. 6A to FIG. 6C are schematic diagrams of a role relationship between the first device, the second device, and the third device. A connection relationship between the first device, the second device, and the third device is not limited. If the first device is directly connected to the second device, the first device may directly perform communication transmission with the second device. If the first device is not directly connected to the second device, the first device may perform communication transmission with the second device by using an intermediate device. If the first device is directly connected to the third device, the first device may directly perform communication transmission with the third device. If the first device is not directly connected to the third device, the first device may perform communication transmission with the third device by using an intermediate device.

Optionally, in step 401, the first condition includes any one of the following.

1. A first CSI change degree in a plurality of CSI change degrees of the first device exceeds the first threshold.

The plurality of CSI change degrees are determined based on the pieces of CSI corresponding to the plurality of NDPs For a specific determining process, refer to the related description of step 401$a$. For a calculation manner of the CSI change degree, refer to the foregoing related description.

Optionally, there are a plurality of possible implementations of the first CSI change degree. The following describes several possible implementations.

Manner a: The first CSI change degree is a maximum CSI change degree in the plurality of CSI change degrees.

For example, as shown in FIG. 5A, the plurality of CSI change degrees include two CSI change degrees. A $1^{st}$ CSI change degree is calculated by the sensing receiver 1 by using CSI 1 and CSI 2. A $2^{nd}$ CSI change degree is calculated by the sensing receiver 1 by using CSI 2 and CSI 3. The $1^{st}$ CSI change degree is greater than the $2^{nd}$ CSI change degree. Therefore, the first CSI change degree is the $1^{st}$ CSI change degree in the plurality of CSI change degrees.

Manner b: The first CSI change degree is calculated by the first device by using first CSI and second CSI.

The first CSI is determined by the first device by using a first NDP, the first NDP is a last but (Y−1) NDP received by the first device, and Y is an integer greater than or equal to 1.

The second CSI is determined by the first device by using a pre-indicated NDP, or the second CSI is determined by the first device by using a $w^{th}$ NDP before a first NDP, and w is an integer greater than or equal to 1. For a related example description of the second CSI, refer to the foregoing description.

For example, as shown in FIG. 5A, the first device is a sensing receiver 1, and the sensing receiver 1 may separately measure an NDP 1, an NDP 2, and an NDP 3, to obtain CSI 1 corresponding to the NDP 1, CSI 2 corresponding to the NDP 2, and CSI 3 corresponding to the NDP 3. The first NDP is the last one NDP received by the sensing receiver 1, the first NDP is the NDP 3. Therefore, the first CSI is the CSI 3 determined by the sensing receiver 1 by using the NDP 3. The pre-indicated NDP is the NDP 1. Therefore, the second CSI is the CSI 1 determined by the sensing receiver 1 by using the NDP 1. Therefore, the first CSI change degree is calculated by the sensing receiver 1 by using the CSI 1 and the CSI 3.

For example, as shown in FIG. 5C, the first device is a sensing receiver 1, and the sensing receiver 1 receives an NDP 1, an NDP 2, an NDP 3, and an NDP 4 sent by a sensing transmitter. The first NDP is a last but one NDP received by the sensing receiver 1, that is, the first NDP is the NDP 3. Therefore, the first CSI is the CSI 3 determined by the sensing receiver 1 by using the NDP 3. w=1. Therefore, the second CSI is the CSI 2 determined by the sensing receiver 1 by using a $1^{st}$ NDP (that is, the NDP 2) before the NDP 3. Therefore, the first CSI change degree is calculated by the sensing receiver 1 by using the CSI 2 and the CSI 3.

Manner c: The first CSI change degree is calculated by the first device by using first CSI and CSI in a CSI set; the first CSI is determined by the first device by using a first NDP, the first NDP is a last but (Y−1) NDP received by the first device, and Y is an integer greater than or equal to 1; and the CSI set includes X pieces of CSI, the X pieces of CSI are respectively determined by the first device by using X NDPs before the first NDP, and X is an integer greater than or equal to 2.

In some implementations, a jth piece of CSI in the X pieces of CSI is determined by the first device by using a jth NDP before the first NDP, and j is an integer greater than or equal to 1 and less than or equal to X. The first device calculates a CSI change degree 1 by using the first CSI and a $1^{st}$ piece of CSI in the X pieces of CSI, the first device calculates a CSI change degree 2 by using the $1^{st}$ piece of CSI and a $2^{nd}$ piece of CSI in the X pieces of CSI, the first device calculates a CSI change degree 3 by using a $2^{nd}$ piece of CSI and a $3^{rd}$ piece of CSI in the X pieces of CSI, . . . , and the first device calculates a CSI change degree X by using an (X−1)$^{th}$ piece of CSI and an X$^{th}$ piece of CSI in the X pieces of CSI. In other words, the first device may calculate X CSI change degrees (including the CSI change degree 1 to the CSI change degree X). The first device averages the X CSI change degrees, and uses an obtained average CSI change degree as the first CSI change degree.

For example, as shown in FIG. 5C, the first device is a sensing receiver 1, and the sensing receiver 1 receives an NDP 1, an NDP 2, an NDP 3, and an NDP 4 sent by a sensing transmitter. The first NDP is a last but one NDP received by the sensing receiver 1, that is, the NDP 3. The sensing receiver 1 may respectively determine, by using the NDP 1, the NDP 2, the NDP 3, and the NDP 4, CSI 1 corresponding to the NDP 1, CSI 2 corresponding to the NDP 2, CSI 3 corresponding to the NDP 3, and CSI 4 corresponding to the NDP 4. The CSI set includes two pieces of CSI, and the two pieces of CSI are respectively the CSI 1 corresponding to the NDP 1 and the CSI 2 corresponding to the NDP 2. Therefore, the sensing receiver 1 calculates a CSI change degree 1 by using the CSI 3 and the CSI 2, and calculates a CSI change degree 2 by using the CSI 2 and the CSI 1. Then, the sensing receiver 1 averages the CSI change degree 1 and the CSI change degree 2, and uses an obtained average CSI change degree as the first CSI change degree.

2. A ratio of a quantity of CSI change degrees that exceed the first threshold in the plurality of CSI change degrees to a total quantity of CSI change degrees included in the plurality of CSI change degrees is greater than a second threshold Optionally, the second threshold may be set by the first device. When setting the second threshold, the first device may refer to a sensing measurement result, a movement status of a terminal device in a radio environment, and the like. For example, if the first device sets the second threshold to a large threshold, it indicates that the first device needs to perform fine sensing on channel information that always has a large CSI change degree. Otherwise, the second threshold may be set to a small threshold.

For example, as shown in FIG. 5C, the first device is a sensing receiver 1, and the sensing receiver 1 receives an NDP 1, an NDP 2, an NDP 3, and an NDP 4 from a sensing transmitter. The sensing receiver 1 may respectively determine, by using the NDP 1, the NDP 2, the NDP 3, and the NDP 4, CSI 1 corresponding to the NDP 1, CSI 2 corresponding to the NDP 2, CSI 3 corresponding to the NDP 3, and CSI 4 corresponding to the NDP 4. The sensing receiver 1 calculates a CSI change degree 1 by using the CSI 1 and the CSI 2, calculates a CSI change degree 2 by using the CSI 2 and the CSI 3, and calculates a CSI change degree 4 by using the CSI 3 and the CSI 4. In other words, the plurality of CSI change degrees include three CSI change degrees, and the second threshold is 2/3. If two of the three CSI change degrees exceed the first threshold, the first device sends the first information to the third device.

3. At least one CSI change degree in a plurality of CSI change degrees exceeds the first threshold, or a ratio of a quantity of CSI change degrees that exceed a third threshold in the plurality of CSI change degrees to the plurality of CSI change degrees is greater than a second threshold.

In this manner, step 401 specifically includes: When the at least one of the plurality of CSI change degrees exceeds the first threshold, the first device sends the first information to the third device, where the first information indicates that the CSI change degree exceeds the first threshold; or when the ratio of the quantity of CSI change degrees that exceed the third threshold in the plurality of CSI change degrees to the plurality of CSI change degrees exceeds the second threshold, the first device sends the first information to the third device, where the first information indicates that the CSI change degree exceeds the third threshold.

Optionally, the first threshold, the second threshold, and the third threshold are set by the first device. For setting descriptions of the first threshold and the second threshold, refer to the foregoing related descriptions.

In a possible implementation, if the third threshold is less than the first threshold, the first threshold is large, and the CSI change degree exceeds the first threshold, it indicates that the CSI change degree is large. Compared with the first threshold, the third threshold may be small. If the ratio of the quantity of CSI change degrees that exceed the third threshold in the plurality of CSI change degrees to the plurality of CSI change degrees is greater than the second threshold, it indicates that the CSI change degree is large, that is, the CSI change degree is compared with the third threshold and the ratio of the CSI change degrees that exceed the third threshold is used to represent an overall CSI change degree.

For example, the plurality of CSI change degrees include six CSI change degrees. If one of the six CSI change degrees exceeds the first threshold, the first device sends the first information to the third device, to indicate that the CSI change degree exceeds the third threshold.

For example, the plurality of CSI change degrees include six CSI change degrees, and if two of the six CSI change degrees exceed the first threshold, the first device sends the first information to the third device, where the first information indicates that the CSI change degree exceeds the first threshold. The second threshold is 2/3. If four of the six CSI change degrees exceed the third threshold, the first device sends the first information to the third device, to indicate that the CSI change degree exceeds the third threshold.

It should be noted that, optionally, in step 402, the first device may further feed back a result of the CSI change degree to the third device, for example, a specific value of the CSI change degree.

In some implementations, if the first condition is not met, the first device may not feed back the information to the third device; the first device ignores the plurality of NDPs; or the first device feeds back third information to the third device.

For an implementation in which the first device feeds back the third information to the third device, optionally, the embodiment shown in FIG. 4 further includes step 403.

403: When the first condition is not met, the first device sends second information to the third device. The second information indicates that the CSI change degree does not exceed the first threshold. Correspondingly, when the first condition is not met, the third device receives the second information from the first device.

For example, as shown in FIG. 5A, the first device is a sensing receiver 2, and the sensing receiver 2 obtains two CSI change degrees by using an NDP 1, an NDP 2, and an NDP 3. The sensing receiver 2 determines, based on the two CSI change degrees, that the first condition is not met, and the sensing receiver 2 feeds back second information to a sensing transmitter, to indicate that the CSI change degree does not exceed the first threshold.

In other words, if the first condition is met, the first device performs step 402; or if the first condition is not met, the first device performs step 403.

In some implementations, the embodiment shown in FIG. 4 further includes step 404, and step 404 may be performed after step 402.

404: The first device sends the maximum CSI change degree in the plurality of CSI change degrees to the third device. Correspondingly, the third device receives the maximum CSI change degree in the plurality of CSI change degrees from the first device.

For example, as shown in FIG. 5A, the first device is a sensing receiver 1, and the second device is a sensing transmitter. The plurality of CSI change degrees include two CSI change degrees. A $1^{st}$ CSI change degree is calculated by the sensing receiver 1 by using CSI 1 and CSI 2. A $2^{nd}$ CSI change degree is calculated by the sensing receiver 1 by using CSI 2 and CSI 3. The $1^{st}$ CSI change degree is greater than the $2^{nd}$ CSI change degree. Therefore, the sensing receiver 2 sends the $1^{st}$ CSI change degree in the plurality of CSI change degrees to the sensing transmitter.

In some implementations, the embodiment shown in FIG. 4 further includes step 405 and step 406.

405: The third device sends a feedback trigger to the first device. Correspondingly, the first device receives the feedback trigger from the third device. The feedback trigger triggers the first device to feed back a sensing measurement result.

Optionally, the sensing measurement result includes at least one of the following: a variation of the CSI and information about that the CSI change degree exceeds the first threshold.

For example, as shown in FIG. 5A, the first device is a sensing receiver 1, and the third device is a sensing transmitter. The sensing transmitter sends a feedback trigger to the sensing receiver 1. The feedback trigger triggers the sensing receiver 1 to feed back a sensing measurement result.

406: The first device sends the sensing measurement result to the third device. Correspondingly, the third device receives the sensing measurement result from the first device.

For example, as shown in FIG. 5A, the first device is a sensing receiver 1, and the third device is a sensing transmitter. The sensing receiver 1 sends a sensing measurement result to the sensing transmitter.

In some implementations, the foregoing steps 402 to 406 may be performed in the reporting phase shown in FIG. 1A.

Optionally, the embodiment shown in FIG. 4 further includes step 401b.

401b: The first device receives at least one of the following: first indication information, second indication information, and third indication information.

The first indication information indicates Y, and Y is an integer greater than or equal to 1. The first NDP is a last but (Y−1) NDP received by the first device. In other words, the first indication information includes a time offset, and the time offset indicates a value of Y.

For example, as shown in FIG. 5C, a sensing receiver 1 receives an NDP 1, and the sensing receiver 1 determines, by using the NDP 1, CSI 1 corresponding to the NDP 1. After the sensing receiver 1 receives an NDP 2, the sensing receiver determines, by using the NDP 2, CSI 2 corresponding to the NDP 2. When the sensing receiver 1 calculates a CSI change degree 1 by using the CSI 2 corresponding to the NDP 2 and the CSI 1 corresponding to the NDP 1, the sensing receiver 1 receives an NDP 3. In other words, a moment at which the sensing receiver 1 calculates the CSI change degree 1 is offset by receive time of one NDP relative to a moment at which the sensing receiver 1 receives the NDP 2. In other words, the time offset is 1, and Y=2.

For example, as shown in FIG. 5B, a sensing receiver 1 receives an NDP 2, and the sensing receiver 1 determines, by using the NDP 1, CSI 1 corresponding to the NDP 1. After the sensing receiver 1 receives an NDP 2, the sensing receiver 1 determines, by using the NDP 2, CSI 2 corresponding to the NDP 2. When the sensing receiver 1 calculates a CSI change degree 1 by using the CSI 2 and the CSI 1, the sensing receiver 1 receives an NDP 3. In other words, a moment at which the sensing receiver 1 calculates the CSI change degree 1 is offset by receive time of two NDPs relative to a moment at which the sensing receiver 1 receives the NDP 1. In other words, the time offset is 2, and Y=3.

The second indication information indicates that the first device uses a multi-CSI change degree scenario or a single-CSI change degree scenario and/or indicates a plurality of CSI change degree calculation manners used by the first device. For the plurality of CSI change degree calculation manners used by the first device, refer to the related descriptions of the foregoing calculation manners of the plurality of CSI change degrees.

The multi-CSI change degree scenario means that a quantity of times that the first device feeds back information indicating whether the first threshold is met is less than a quantity of CSI change degrees calculated by the first device. The single-CSI change degree scenario means that the first device feeds back, for each CSI change degree, information indicating whether the CSI change degree meets the first threshold.

For example, as shown in FIG. 5A, the plurality of CSI change degrees include two CSI change degrees, but a sensing receiver 1 feeds back, only once for the two CSI change degrees, information about whether the CSI change degree exceeds the first threshold. In this case, it may be referred to as that the sensing receiver 1 uses the multi-CSI change degree scenario The third indication information indicates CSI that corresponds to an NDP latest received by the first device and that is in pieces of CSI that participate in calculation of the plurality of CSI change degrees in the first device.

For example, as shown in FIG. 5C, the first device is a sensing receiver 1, and the sensing receiver 1 receives an NDP 1, an NDP 2, an NDP 3, and an NDP 4. The sensing receiver 1 may respectively determine, by using the NDP 1, the NDP 2, the NDP 3, and the NDP 4, CSI 1 corresponding to the NDP 1, CSI 2 corresponding to the NDP 2, CSI 3 corresponding to the NDP 3, and CSI 4 corresponding to the NDP 4. The third indication information indicates the CSI 3 corresponding to the NDP 3. In this case, the first device may calculate a CSI change degree 1 by using the CSI 3 corresponding to the NDP 3 and the CSI 2 corresponding to the NDP 2 and may calculate a CSI change degree 2 by using the CSI 2 corresponding to the NDP 2 and the CSI 1 corresponding to the NDP 1. In other words, the first device determines the plurality of CSI change degrees, specifically including the CSI change degree 1 and the CSI change degree 2.

Optionally, step 401b may be performed before step 401.

Specifically, the first device may receive at least one of the following from the second device or the third device: first indication information, second indication information, and third indication information.

In a possible implementation, the second device is a sensing transmitter, and the sensing transmitter may send the first indication information and the second indication information in the setup phase or the measurement phase shown in FIG. 1A. The sensing transmitter may send the third indication information in the reporting phase shown in FIG. 1A.

In another possible implementation, the third device is a sensing initiator, and the sensing initiator may send the first indication information and the second indication information in the setup phase or the measurement phase shown in FIG. 1A. The sensing initiator may send the third indication information in the reporting phase shown in FIG. 1A.

Optionally, that the first device receives the first indication information and/or the second indication information from the second device or the third device may be performed in the setup phase or the measurement phase shown in FIG. 1A. This is not specifically limited in this application. That the first device receives the third indication information from the second device or the third device may be performed in the reporting phase shown in FIG. 1A. This is not specifically limited in this application.

It should be noted that, optionally, in the embodiment shown in FIG. 4, the first device, the second device, and the third device may exchange respective multi-CSI change degree support indications. The multi-CSI change degree support indication indicates whether a corresponding device supports a multi-CSI change degree scenario. For example, the first device sends the multi-CSI change degree support indication to the second device and the third device, to indicate that the first device supports the multi-CSI change degree scenario. If the third device is a sensing initiator, the third device may select the first device as a sensing receiver and may establish a sensing session between the third device and the first device.

It should be noted that, optionally, a process in which the first device, the second device, and the third device may exchange their respective multi-CSI change degree support indications may be performed in the discovery phase shown in FIG. 1A, or may be performed in another phase. This is not specifically limited in this application.

Optionally, the embodiment shown in FIG. 4 further includes step 401c. Step 401c and step 401d may be performed before step 401.

401c: A fourth device sends a first frame to the first device. The first frame is used to establish a sensing session. Correspondingly, the first device receives the first frame from the fourth device.

The fourth device may be a sensing initiator, and the first device is a sensing receiver. The first frame is used to establish one or more sensing sessions. For a related description of the first frame, refer to the related description of FIG. 7 below.

Optionally, the second device, the third device, and the fourth device may be a same device, or may be different devices. This is not specifically limited in this application. For example, the second device, the third device, and the fourth device are a same device, and the device serves as both a sensing transmitter and a sensing initiator.

401d: The first device determines information about the sensing session based on the first frame.

Specifically, the first device determines, based on the first frame, the information about the sensing session established between the fourth device and the first device.

Figure 7:
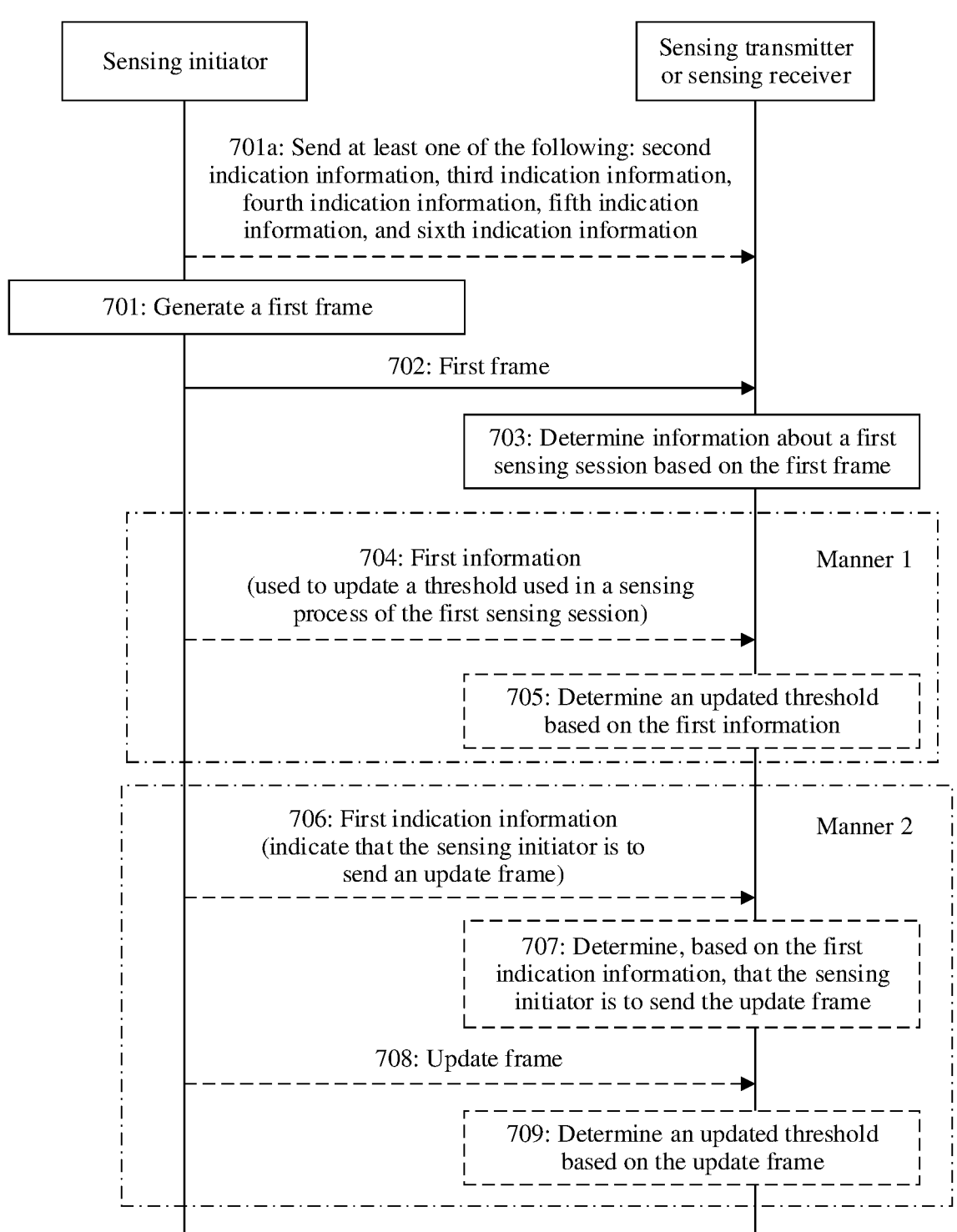
FIG. 7 is another schematic diagram of an example communication method according to an embodiment of this application.

Step 401c and step 401d are similar to step 702 and step 703 in the embodiment shown in FIG. 7. For details, refer to related descriptions of step 702 and step 703 in the embodiment shown in FIG. 7.

It should be noted that, optionally, step 401c and step 401d may be performed in the setup phase shown in FIG. 1A, or may be performed in another phase. This is not specifically limited in this application.

There is no fixed execution sequence between step 401c and step 401d, and step 401b. Step 401c and step 401d may be first performed, and then step 401b is performed; step 401b is first performed, and then step 401c and step 401d are performed; or step 401c and step 401d, and step 401b are simultaneously performed based on a case. This is not specifically limited in this application.

In this embodiment of this application, the first device receives the plurality of NDPs from the second device, where one of the plurality of NDPs corresponds to one piece of CSI; when the first condition is met, the first device sends the first information to the third device, where the first information indicates that the CSI change degree exceeds the first threshold; and the first condition includes any one of the following: the first CSI change degree in the plurality of CSI change degrees of the first device exceeds the first threshold, and the ratio of the quantity of CSI change degrees that exceed the first threshold in the plurality of CSI change degrees to the plurality of CSI change degrees is greater than the second threshold. The plurality of CSI change degrees are determined based on the pieces of CSI corresponding to the plurality of NDPs It can be learned that the foregoing technical solution provides the manner in which the first device feeds back the CSI change degree to the third device for the plurality of CSI change degrees of the first device. When the first condition is met, the first device sends the first information to the third device, where the first information indicates that the CSI change degree exceeds the first threshold. Therefore, effective sensing of the radio environment is implemented.

FIG. 7 is another schematic diagram of an example communication method according to an embodiment of this application. As shown in FIG. 7, the communication method includes the following steps.

701: A sensing initiator generates a first frame.

The first frame is used to establish one or more sensing sessions. The first frame may be referred to as a sensing request frame, a sensing initiation frame, or a sensing setup frame. Specifically, a name of the first frame is not limited in this application.

In some implementations, the first frame includes at least one user field, and one user field may include information about a user level of a corresponding sensing session.

Optionally, the first frame is used to establish a first sensing session, and the first sensing session is a sensing session established between the sensing initiator and a sensing receiver or a sensing transmitter. The at least one user field includes a first user field. The first user field includes one of the following indications: an association identifier (or an unassociated identifier), a responder role indication, a user threshold indication, first user information, and second user information. The first user field includes information about a user level of the first sensing session.

The following describes content included in the first user field.

1. The association identifier (AID) is an identifier of the sensing receiver or the sensing transmitter, and identifies the first sensing session.

It should be noted that the association identifier is used as an example for description herein. In actual application, the first user field may alternatively include the unassociated identifier (UID), to indicate an identification number of an unassociated user. In this implementation, the other part of the first user field includes related information based on the unassociated user. The following describes the technical solutions of this application by using an example in which the first user field includes the association identifier.

2. The responder role indication indicates a role of the sensing transmitter or a role of the sensing receiver. In other words, it indicates whether the sensing initiator establishes the first sensing session with the sensing transmitter, or establishes the first sensing session with the sensing receiver.

3. The user threshold indication indicates a user level threshold used in a sensing process of the first sensing session. In other words, it indicates that the user level threshold is used in the sensing process of the first sensing session.

For example, the following describes, with reference to Table 1, a correspondence between an indication value indicated by the user threshold indication and the user level threshold.

TABLE 1

| Indication value | User level threshold |
|---|---|
| 1 | 0.1 |
| 2 | 0.2 |
| . . . | . . . |
| 10 | 10 |
| 11 | Threshold-based sensing process is not used |
| . . . | . . . |

For example, if the indication value is 0, the user threshold is 0.1, that is, 0.1 is used as the threshold in the sensing process of the first sensing session.

For example, the indication value is 11, it indicates that the threshold-based sensing procedure is not used. In other words, in the sensing process of the first sensing session, a process A in the reporting phase shown in FIG. 1A is not performed, but a process B in the reporting phase shown in FIG. 1A is performed. It should be noted that, optionally, the sensing initiator may also add one piece of indication information to the first user field, to indicate that the first sensing session does not use the threshold-based sensing procedure. This is not specifically limited in this application.

4. The first user information is user information that depends on a responder role.

In a possible implementation, the responder role is a sensing receiver, and the first user information includes a feedback type fed back by the sensing receiver to the sensing initiator. For example, the feedback type fed back by the sensing receiver to the sensing initiator may include at least one of the following: uncompressed CSI, compressed CSI, an NDP, a sensing measurement result, and a result of a CSI change degree.

It should be noted that, if the sensing initiator is also used as the sensing receiver, the first user field may not include the first user information.

In another possible implementation, the responder role is a sensing transmitter, and the first user information includes at least one of the following: information about a sensing receiver of the first perception session and configuration information of an NDPA. The information about the sensing receiver of the first sensing session may include an identifier of the sensing receiver of the first sensing session, so that the sensing transmitter determines sensing receivers with which the sensing transmitter performs sensing interaction. The configuration information of an NDPA is used by the sensing transmitter to send the NDPA. For example, the configuration information of an NDPA includes a resource for sending the NDPA, and the sensing transmitter may send the NDPA by using the resource.

It should be noted that, if the sensing initiator is also used as the sensing transmitter, the first user field may not include the first user information.

5. The second user information is user information that depends on a session type or a measurement setup type.

The session type or the measurement setup type includes any one of the following: the sensing initiator is the sensing transmitter, the sensing initiator is the sensing receiver, and the sensing initiator is neither the sensing transmitter nor the sensing receiver.

The second user information refers to some additional information that the sensing transmitter or the sensing receiver needs to learn of based on the session type or the measurement setup type.

For example, for the first sensing session, the sensing initiator is the sensing receiver, and the second user information may include at least one of the following: a feedback type fed back by the sensing receiver to the sensing transmitter and a trigger indication, where the trigger indication indicates whether the sensing transmitter triggers a feedback of the sensing receiver serving as the sensing initiator. The feedback type fed back by the sensing receiver to the sensing initiator may include at least one of the following: uncompressed CSI, compressed CSI, an NDP, a sensing measurement result, and a result of a CSI change degree.

For example, for the first sensing session, the sensing initiator is neither the sensing transmitter nor the sensing receiver, the sensing receiver feeds back the feedback type to the sensing transmitter.

It should be noted that, for the first sensing session, if the sensing initiator is the sensing transmitter, the first user field may not include the second user information.

The foregoing describes a solution in which the first frame is used to establish the first sensing session and the first user field. In actual application, the first frame may be further used to establish one or more sensing sessions, and each sensing session may correspond to one user field. This is not specifically limited in this application. The foregoing is merely described by using the first sensing session and the first user field as an example, and does not constitute a limitation on this application.

The foregoing describes the user field in the first frame by using the first user field. A format of another user field in the first frame is similar.

In some implementations, the first frame further includes a common field. For example, as shown in FIG. 8A, the first frame includes a common field and at least one user field.

The common field includes at least one of the following: a measurement setup identifier, a measurement moment identifier, an instantaneous or delayed feedback indication, a sensing transmitter feedback type, a sensing receiver feedback type, a session type or a measurement setup type, a common threshold indication, a threshold variable indication, and common information.

The following describes content included in the common field.

1. The measurement setup identifier indicates an identification number of one or more sensing sessions.

The one or more sensing sessions may share some parameters. Therefore, the common field indicates the one or more sensing sessions by using the measurement setup identifier, so that the one or more sensing sessions share information included in the common field.

For example, as shown in FIG. 1A, the sensing initiator establishes a sensing session in the setup phase. The sensing initiator may mark, by using the measurement setup identifier, one or more sensing sessions established by the sensing initiator, so that the one or more sensing sessions share information in the common field.

It should be noted that, optionally, the one or more sensing sessions may include the first sensing session described above. In other words, the first sensing session may share the information in the common field.

2. The measurement moment identifier indicates an NDP of each sensing session in the one or more sensing sessions.

The measurement moment identifier indicates an NDP based on which a CSI change degree is fed back or sent in the one or more sensing sessions. In other words, the CSI change degree is fed back or sent based on the indicated NDP.

3. The instantaneous or delayed feedback indication indicates an instantaneous feedback or delayed feedback of a sensing measurement result of one or more sensing sessions.

It can be learned that the sensing initiator indicates, by using the instantaneous or delayed feedback indication, an instantaneous feedback or delayed feedback of the sensing measurement result of the one or more sensing sessions. For example, the sensing initiator indicates the delay feedback of the sensing measurement result of the one or more sensing sessions. In this way, the sensing receiver may have sufficient time to calculate a corresponding CSI change degree, so that the sensing receiver feeds back whether the CSI change degree exceeds a threshold.

4. The sensing transmitter feedback type includes at least one of the following: uncompressed channel state information (CSI), compressed CSI, a null data packet (NDP), a sensing measurement result, and a feedback of a CSI change degree (for example, met information or Not met information in a feedback response).

5. The sensing receiver feedback type includes at least one of: uncompressed channel state information (CSI), compressed CSI, a null data packet (NDP), a sensing measurement result, and a feedback of a CSI change degree (for example, met information or Not met information in a feedback response).

6. Session type or measurement setup type. For the session type or the measurement setup type, refer to the foregoing related description.

7. The common threshold indication indicates a common threshold used in a sensing process of one or more sensing sessions. In other words, the common threshold is a threshold used in the sensing process of the one or more sensing sessions.

A manner of the common threshold indication is similar to the foregoing indication manner of the user threshold indication. For details, refer to the foregoing related description of the user threshold indication.

It should be noted that, optionally, if the one or more sensing sessions include the first sensing session, the sensing receiver may ignore the common threshold, and perform sensing measurement based on the user level threshold.

8. The threshold variable indication indicates whether a threshold used in a sensing process of one or more sensing sessions is variable.

9. The common information is common information that depends on a session type or a measurement setup type.

The session type or the measurement setup type includes any one of the following: the sensing initiator is the sensing transmitter, the sensing initiator is the sensing receiver, and the sensing initiator is neither the sensing transmitter nor the sensing receiver.

The common information refers to some additional information that the sensing transmitter or the sensing receiver needs to learn of based on the session type or the measurement setup type.

For example, for the one or more sensing sessions, the sensing initiator is the sensing receiver, and the common information may include at least one of the following: a feedback type fed back by the sensing receiver to the sensing transmitter and a trigger indication, where the trigger indication indicates whether the sensing transmitter triggers a feedback of the sensing receiver serving as the sensing initiator. The feedback type fed back by the sensing receiver to the sensing initiator may include at least one of the following: uncompressed CSI, compressed CSI, an NDP, a sensing measurement result, and a result of a CSI change degree.

For example, for the one or more sensing sessions, the sensing initiator is neither the sensing transmitter nor the sensing receiver, the sensing receiver feeds back the feedback type to the sensing transmitter.

It should be noted that, for the one or more sensing sessions, if the sensing initiator is the sensing transmitter, the common field does not include the common information.

It should be noted that the formats of the first frame, the user field, and the common field shown in FIG. 8A to FIG. 8C are merely examples. In actual application, some fields of the common field in the first frame may also be moved to the user field, and some fields of the user field may also be moved to the common field. This is not specifically limited in this application. When the first frame is used to establish one sensing session, the first frame may include only a user field.

In the foregoing step 701, the sensing initiator establishes the one or more sensing sessions by using the first frame and establishes sensing measurement (that is, sensing measurement established based on one or more sensing sessions identified by a measurement setup identification number in the common field) based on these sensing sessions. In actual application, the sensing initiator may also establish the one or more sensing sessions by using a plurality of frames, and establish sensing measurement based on the one or more sensing sessions. For example, the sensing initiator may first establish the one or more sensing sessions by using one frame, and then establish sensing measurement based on the one or more sensing sessions by using another frame. Alternatively, the sensing initiator may first establish sensing measurement by using one frame, and then establish the one or more sensing sessions based on the sensing measurement by using another frame. This is not specifically limited in this application.

702: The sensing initiator sends the first frame.

The sensing initiator may send the first frame, and correspondingly, the sensing transmitter or the sensing receiver may receive the first frame.

703: The sensing transmitter or the sensing receiver determines information about the first sensing session based on the first frame.

In a possible implementation, the first sensing session is a sensing session established between the sensing initiator and the sensing transmitter. For the sensing transmitter, the sensing transmitter determines the information about the first sensing session based on the first frame. For example, the sensing transmitter is a device corresponding to the association identifier in the first user field. The sensing transmitter may determine the information about the first sensing session based on the first frame. For example, the sensing transmitter may read, from the first user field, the user level threshold used in the sensing process of the first sensing session, the information about the sensing receiver, and the resource for sending the NDPA.

Optionally, that the sensing transmitter may determine the information about the first sensing session based on the first frame further includes: The sensing transmitter reads the common information of the first sensing session from the common field in the first frame, for example, a sensing receiver feedback type and a session type of the first sensing session.

In another possible implementation, the first sensing session is a sensing session established between the sensing initiator and the sensing receiver. For the sensing receiver, if the sensing receiver is a device corresponding to the association identifier in the first user field, the sensing transmitter may determine the information about the first sensing session based on the first frame. For example, the sensing receiver may read a sensing receiver feedback type from the first user field.

Optionally, that the sensing transmitter may determine the information about the first sensing session based on the first frame includes: The sensing transmitter can read the common information of the first sensing session from the common field, for example, an instantaneous feedback or delayed feedback of the sensing measurement result of the first sensing session.

It should be noted that, optionally, step 701 to step 703 may be performed in the setup phase of the sensing process of the sensing session, or may be performed in another phase of the sensing process of the sensing session. This is not specifically limited in this application.

Optionally, the sensing initiator may update the threshold used in the sensing process of the sensing session. There are a plurality of specific update manners. The following describes two possible update manners by using the threshold used by the sensing initiator to update the sensing process of the first sensing session as an example.

Manner 1 is described below with reference to step 704 and step 705. Optionally, the embodiment shown in FIG. 7 further includes step 704 and step 705.

704: The sensing initiator sends first information.

The first information is used to update the threshold used in the sensing process of the first sensing session. For example, the first information includes an updated threshold.

705: The sensing transmitter or the sensing receiver determines the updated threshold based on the first information.

In some implementations, if the sensing initiator also plays a role of the sensing transmitter, the first sensing session is established between the sensing initiator and the sensing receiver. The sensing initiator sends the first information to the sensing receiver, where the first information may be carried in an NDPA or a feedback request. Correspondingly, the sensing receiver receives the first information sent by the sensing initiator, and determines the updated threshold based on the first information.

In some implementations, if the sensing initiator also plays a role of the sensing receiver, the first sensing session is established between the sensing initiator and the sensing transmitter. The sensing initiator sends the first information to the sensing transmitter. The first information may be carried in a feedback response or a sensing feedback. Correspondingly, the sensing transmitter receives the first information sent by the sensing initiator, and determines the updated threshold based on the first information.

In some implementations, if the sensing initiator is neither the sensing transmitter nor the sensing receiver, the first sensing session is established between the sensing initiator and the sensing receiver, and the sensing initiator sends the first information to the sensing receiver. The first information may be carried in a response frame, and the response frame is used by the sensing receiver to respond to the sensing initiator and feed back the sensing measurement result of the first sensing session. Correspondingly, the sensing receiver receives the first information sent by the sensing initiator, and determines the updated threshold based on the first information.

It should be noted that, optionally, step 704 and step 705 may be performed in the measurement phase or the reporting phase in the sensing process of the first sensing session, or may be performed in another phase in the sensing process of the first sensing session. This is not specifically limited in this application.

Manner 2 is described below with reference to step 706 to step 709. Optionally, the embodiment shown in FIG. 7 further includes step 706 to step 709.

706: The sensing initiator sends first indication information.

The first indication information indicates that the sensing initiator is to send an update frame, and the update frame is used to update the threshold used in the sensing process of the first sensing session.

Specifically, in the foregoing step 706, when the sensing initiator sends the first indication information, it indicates that the update frame is subsequently sent to update the information in the first sensing session, for example, the threshold used in the sensing process of the first sensing session.

In some implementations, if the sensing initiator is the sensing transmitter, the first indication information may be carried in an NDP, a feedback request, or the like. The sensing initiator sends the first indication information to the sensing receiver. Correspondingly, the sensing receiver receives the first indication information from the sensing initiator.

In some implementations, if the sensing initiator is the sensing receiver, the first indication information may be carried in a feedback response or a sensing feedback. Correspondingly, the sensing initiator sends the first indication information to the sensing transmitter, and correspondingly, the sensing transmitter receives the first indication information from the sensing initiator.

In some implementations, if the sensing initiator is neither the sensing transmitter nor the sensing receiver, the first information is carried in a response frame, where the response frame is used by the sensing receiver to respond to the sensing initiator and feed back the sensing measurement result of the first sensing session. Correspondingly, the sensing initiator sends the first indication information to the sensing receiver, and correspondingly, the sensing receiver receives the first indication information from the sensing initiator.

707: Determine, based on the first indication information, that the sensing initiator is to send the update frame.

708: The sensing initiator sends the update frame.

709: The sensing transmitter or the sensing receiver determines an updated threshold based on the update frame.

Figure 9:
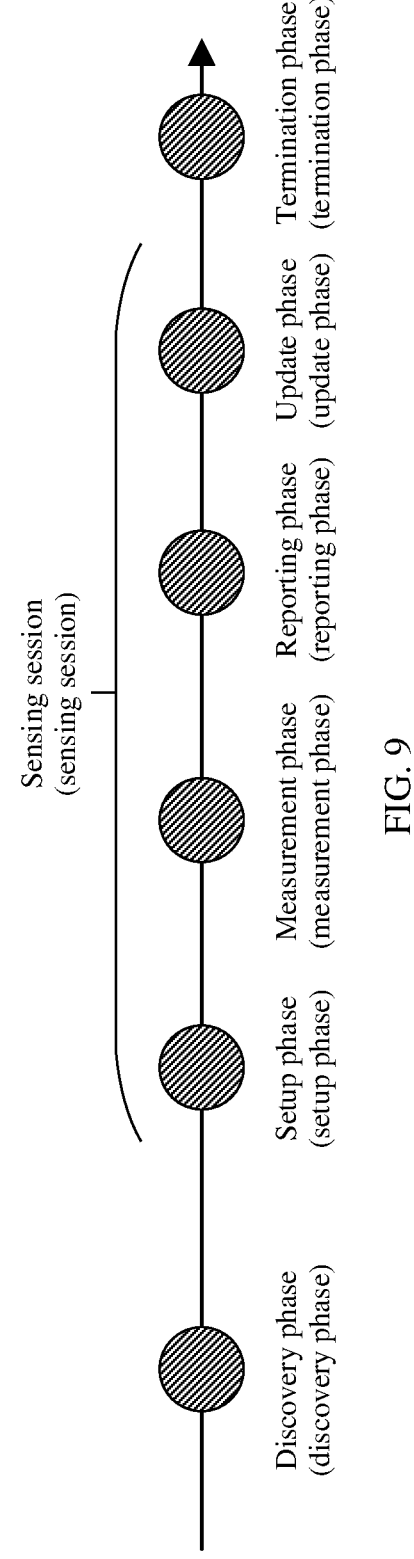
FIG. 9 is another schematic diagram of phases included in a sensing process of an example sensing session according to an embodiment of this application.

It should be noted that, optionally, step 706 to step 709 may be performed in the setup phase, the measurement phase, or the reporting phase in the sensing process of the first sensing session. Alternatively, the foregoing step 706 to step 709 may also be performed in an update phase added in the sensing process of the first sensing session. For example, as shown in FIG. 9, an update phase is added to the sensing process of the first sensing session, and the update phase may be used by the sensing initiator to update the threshold used in the sensing process of the first sensing session. This is not specifically limited in this application. A location of the update phase shown in FIG. 9 is an example. In actual application, the location of the update phase in the sensing process is not limited. For example, the update phase may be between the measurement phase and the reporting phase, or the update phase may be between the setup phase and the measurement phase. This is not specifically limited in this application.

It should be noted that, optionally, the sensing initiator may directly send the update frame without sending the first indication information. This is not specifically limited in this application. It should be noted that, when the sensing initiator is the sensing receiver, the sensing initiator may not send the first indication information and the update frame.

Optionally, the embodiment shown in FIG. 7 further includes step 701*a*. Step 701*a* may be performed before step 701.

701*a*: The sensing initiator sends at least one of the following: second indication information, third indication information, fourth indication information, fifth indication information, and sixth indication information.

The second indication information indicates whether the sensing initiator supports a threshold-based sensing process. For example, the threshold-based sensing process may be understood as the sensing process in the measurement phase shown in FIG. 1B.

The third indication information indicates that the sensing initiator supports to be roles/a role of the sensing initiator, the sensing responder, the sensing transmitter, and/or the sensing receiver.

Specifically, the sensing initiator indicates, by using the third indication information, which roles are supported by the sensing initiator.

For example, the third indication information is a bitmap, and the bitmap includes four bits that respectively correspond to the sensing initiator, the sensing responder, the sensing receiver, and the sensing transmitter. For example, a bitmap "1101" indicates that the sensing initiator, the sensing responder, and the sensing transmitter are supported. For example, the third indication information includes an index. When the index is 1, it indicates that only the sensing initiator is supported. When the index is 2, it indicates that the sensing transmitter and the sensing initiator are supported.

The fourth indication information indicates an initial threshold. For example, if the sensing initiator supports the threshold-based sensing process, the sensing initiator sends the fourth indication information to indicate the initial threshold.

The fifth indication information indicates whether the threshold used in the sensing process of the sensing session is variable.

The sixth indication information indicates an instantaneous feedback or delayed feedback of the sensing measurement result of the sensing session.

It should be noted that, in step 701*a*, the sensing initiator indicates, by using the third indication information, a role that can be played by the sensing initiator. In actual application, the sensing initiator may also indicate, by using seventh indication information, that the sensing initiator supports to be the sensing initiator, indicate, by using eighth indication information, whether the sensing initiator supports to be the sensing responder, indicate, by using ninth indication information, whether the sensing initiator supports to be the sensing transmitter, and indicate, by using tenth indication information, whether the sensing initiator supports to be the sensing receiver. In other words, the sensing initiator separately indicates, by using the four pieces of indication information, whether the sensing initiator supports to be the corresponding role. This is not specifically limited in this application.

The foregoing step 701*a* uses the sensing initiator as an example to describe the technical solution of this application. Because the sensing initiator may initiate the sensing session, the fourth indication information indicates the initial threshold. However, for a device (for example, the sensing transmitter or the sensing receiver) that does not support to be the sensing initiator, the device may send corresponding indication information to indicate that there is no initial threshold. In other words, the device does not support to be the sensing initiator, and therefore does not have a capability of setting the initial threshold.

For example, the following describes, with reference to Table 2, a correspondence between an indication value indicated by the fourth indication information and the initial threshold.

TABLE 2

| Indication value | Initial threshold |
|---|---|
| 0 | 0 |
| 1 | 0.1 |
| 2 | 0.2 |
| . . . | . . . |
| 10 | 10 |
| 11 | No initial threshold or initial threshold is not supported |
| . . . | . . . |

For example, if the fourth indication information includes the indication value "1", it indicates that the initial threshold is 0.1.

It should be noted that, optionally, if the sensing receiver feeds back the CSI change degree based on a plurality of thresholds, the fourth indication information may indicate a plurality of initial thresholds. For example, the sensing receiver determines a plurality of CSI change degrees by using a plurality of NDPs. If one of the plurality of CSI change degrees exceeds the threshold 1, the sensing receiver feeds back that the CSI change degree exceeds the threshold 1.

Alternatively, if there is a specific proportion of CSI change degrees that are in the plurality of CSI change degrees and that exceed the threshold 2, the sensing receiver feeds back that the CSI change degree exceeds the threshold 2. Therefore, the fourth indication information may indicate a plurality of initial thresholds, so that the sensing receiver feeds back the CSI change degree. It should be noted that step 701*a* may be performed in the discovery phase shown in FIG. 1A, or may be performed in another phase. This is not specifically limited in this application. The foregoing step 701*a* uses the sensing initiator as an example to describe the process of information exchange between the devices in the sensing system. In actual application, different devices in the sensing system may exchange the information shown in step 701*a*. In this way, the device in the sensing system learns of capability information of another device, and the like.

In the embodiment shown in FIG. 7, the technical solutions of this application are described by using the sensing initiator as an example. In actual application, the technical solutions may also be performed by another device (for example, the sensing transmitter or the sensing receiver). This is not specifically limited in this application.

In this embodiment of this application, the sensing initiator may initiate a first frame, and the first frame is used to establish a first sensing session. It can be learned from the related description of the first frame that, the first frame of the sensing initiator may indicate related information of the first sensing session, for example, the user level threshold and the role information of the device that are used in the sensing process of the first sensing session. It can be learned that, in the foregoing technical solution, setup of the sensing session and sending of the related information of the sensing session can be implemented, so that the sensing transmitter and the sensing receiver obtains the related information of the sensing session, thereby facilitating execution of the sensing process.

Figure 10:
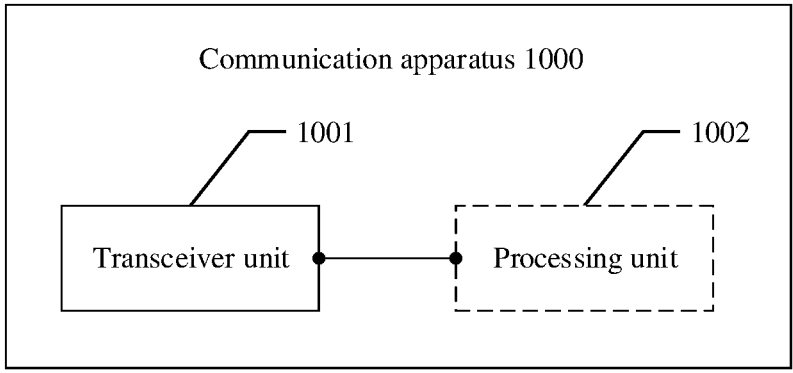
FIG. 10 is a schematic diagram of a structure of an example communication apparatus according to an embodiment of this application.

The foregoing describes the communication method provided in this application. This application further provides a communication apparatus. As shown in FIG. 10, a communication apparatus 1000 includes a transceiver unit 1001. Optionally, the communication apparatus 1000 further includes a processing unit 1002. The communication apparatus 1000 is configured to implement the method performed by the first device in the embodiment shown in FIG. 4. In some implementations, the communication apparatus 1000 is applied to a first device. The first device may be a sensing receiver, and the sensing receiver may be an AP or a STA.

The transceiver unit 1001 is configured to: receive a plurality of NDPs from a second device, where one of the plurality of NDPs corresponds to one piece of CSI; and when a first condition is met, send first information to a third device, where the first information indicates that a CSI change degree exceeds a first threshold; and the first condition includes any one of the following: a first CSI change degree in a plurality of CSI change degrees of the communication apparatus 1000 exceeds the first threshold, and a ratio of a quantity of CSI change degrees that exceed the first threshold in the plurality of CSI change degrees to the plurality of CSI change degrees is greater than a second threshold. The plurality of CSI change degrees are determined based on the pieces of CSI corresponding to the plurality of NDPs.

In a possible implementation, the second device and the third device are a same device, the communication apparatus 1000 is a sensing receiver, and the second device is a sensing transmitter.

In another possible implementation, the communication apparatus 1000 is a first sensing receiver, the second device is a sensing transmitter, and the third device is a sensing initiator or a second sensing receiver.

In another possible implementation, one of the plurality of CSI change degrees is calculated by the communication apparatus 1000 by using at least two pieces of CSI.

In another possible implementation, the processing unit 1002 is configured to determine the plurality of CSI change degrees by using the pieces of CSI corresponding to the plurality of NDPs.

In another possible implementation, the transceiver unit 1001 is configured to receive a feedback request from the third device, where the feedback request is used to trigger the communication apparatus 1000 to feed back a sensing measurement result.

In another possible implementation, the first CSI change degree is a maximum CSI change degree in the plurality of CSI change.

Alternatively, the first CSI change degree is calculated by the communication apparatus 1000 by using first CSI and second CSI; the first CSI is determined by the communication apparatus 1000 by using a first NDP, the first NDP is a last but $(Y-1)$ null data packet (NDP) received by the communication apparatus 1000, and Y is an integer greater than or equal to 1; and the second CSI is determined by the communication apparatus 1000 by using a pre-indicated NDP, or the second CSI is determined by the communication apparatus 1000 by using a $w^{th}$ NDP before the first NDP, and w is an integer greater than or equal to 1.

Alternatively, the first CSI change degree is calculated by the communication apparatus 1000 by using first CSI and CSI in a CSI set; the first CSI is determined by the communication apparatus 1000 by using a first NDP, the first NDP is a last but $(Y-1)$ NDP received by the communication apparatus 1000, and Y is an integer greater than or equal to 1; and the CSI set includes X pieces of CSI, the X pieces of CSI are respectively determined by the communication apparatus 1000 by using X NDPs before the first NDP, and X is an integer greater than or equal to 2.

In another possible implementation, the transceiver unit 1001 is further configured to send the maximum CSI change degree in the plurality of CSI change degrees to the third device.

In another possible implementation, an $i^{th}$ CSI change degree in the plurality of CSI change degrees is calculated by the communication apparatus 1000 by using an $(i+1)^{th}$ piece of CSI and an $i^{th}$ piece of CSI, the $(i+1)^{th}$ piece of CSI is determined by the communication apparatus 1000 by using an $(i+1)^{th}$ NDP received by the communication apparatus 1000, the $i^{th}$ piece of CSI is determined by the communication apparatus 1000 by using an $i^{th}$ NDP received by the communication apparatus 1000, and i is an integer greater than or equal to 1.

Alternatively, an $i^{th}$ CSI change degree is calculated by the communication apparatus 1000 by using an $(i+1)^{th}$ piece of CSI and the second CSI; the second CSI is determined by the communication apparatus 1000 by using a pre-indicated NDP, or the second CSI is determined by the communication apparatus 1000 by using a $w^{th}$ NDP before a first NDP, the first NDP is a last but $(Y-1)$ null data packet (NDP) received by the communication apparatus 1000, Y is an integer greater than or equal to 1, and w is an integer greater than or equal to 1; and the $(i+1)^{th}$ piece of CSI is determined by the communication apparatus 1000 by using an $(i+1)^{th}$ NDP received by the communication apparatus 1000, and i is an integer greater than or equal to 1.

Alternatively, an $i^{th}$ CSI change degree is calculated by the communication apparatus 1000 by using an $(i+1)^{th}$ piece of CSI and an $(i-Q)^{th}$ piece of CSI, the $(i+1)^{th}$ piece of CSI is determined by the communication apparatus 1000 by using an $(i+1)^{th}$ NDP received by the communication apparatus 1000, the $(i-Q)^{th}$ piece of CSI is determined by the communication apparatus 1000 by using an $(i-Q)^{th}$ NDP received by the communication apparatus 1000, i is an integer greater than or equal to 1, Q is an integer greater than or equal to 1, and i is greater than Q.

Alternatively, an $i^{th}$ CSI change degree is calculated by the communication apparatus 1000 by using an $(i+1)^{th}$ piece of CSI and Z pieces of CSI before the $(i+1)^{th}$ piece of CSI, and the $(i+1)^{th}$ piece of CSI is determined by the communication apparatus 1000 by using an $(i+1)^{th}$ NDP received by the communication apparatus 1000, the Z pieces of CSI before the $(i+1)^{th}$ piece of CSI are respectively determined by the communication apparatus 1000 by using Z NDPs before the $(i+1)^{th}$ NDP received by the communication apparatus 1000, i is an integer greater than or equal to 1, and Z is an integer greater than or equal to 1.

In another possible implementation, the transceiver unit 1001 is further configured to:

receive first indication information from the second device or the third device, where the first indication information indicates Y, and Y is an integer greater than or equal to 1.

In another possible implementation, the transceiver unit 1001 is further configured to:

when the first condition is not met, send second information to the third device, where the second information indicates that the CSI change degree does not exceed the first threshold.

In another possible implementation, the transceiver unit 1001 is further configured to:

receive at least one piece of the following information sent by the second device or the third device: second indication information and third indication information The second indication information indicates a plurality of CSI change degree calculation manners used by the communication apparatus 1000 and/or indicates a multi-CSI change degree scenario or a single-CSI change degree scenario used by the communication apparatus 1000. The third indication information indicates CSI that corresponds to a null data group NDP latest received by the communication apparatus 1000 and that is in pieces of CSI that participate in calculation of the plurality of CSI change degrees in the communication apparatus 1000.

Figure 11:
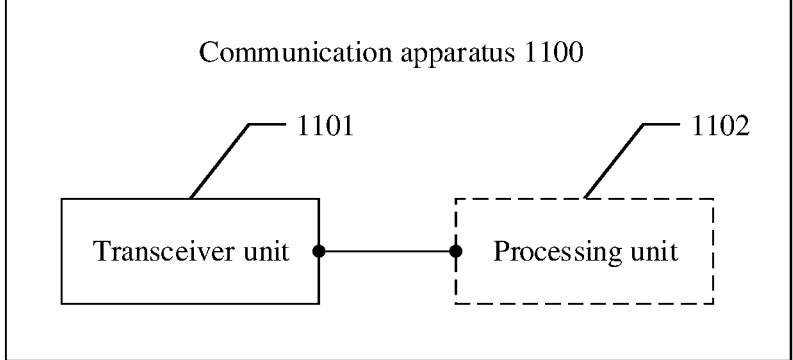
FIG. 11 is another schematic diagram of a structure of an example communication apparatus according to an embodiment of this application.

This application further provides a communication apparatus. As shown in FIG. 11, a communication apparatus 1100 includes a transceiver unit 1101. Optionally, the communication apparatus 1100 further includes a processing unit 1102. The communication apparatus 1100 is configured to implement the method performed by the third device in the embodiment shown in FIG. 4. In some implementations, the communication apparatus 1100 is applied to a third device, and the third device may be a sensing initiator, a sensing transmitter, or a second sensing receiver.

The transceiver unit 1101 is configured to: when a first condition is met, receive first information from a first device, where the first information indicates that a CSI change degree exceeds a first threshold; the first condition includes any one of the following: a first CSI change degree in a plurality of CSI change degrees of the first device exceeds the first threshold, and a ratio of a quantity of CSI change degrees that exceed the first threshold in the plurality of CSI change degrees to the plurality of CSI change degrees is greater than a second threshold; and the plurality of CSI change degrees are determined based on pieces of CSI corresponding to a plurality of NDPs, the plurality of NDPs are received by the first device from a second device, and one of the plurality of NDPs corresponds to one piece of CSI.

In a possible implementation, the second device and the communication apparatus 1100 are a same device, the first device is a sensing receiver, and the second device is a sensing transmitter.

In another possible implementation, the first device is a first sensing receiver, the second device is a sensing transmitter, and the communication apparatus 1100 is a sensing initiator or a second sensing receiver.

In another possible implementation, one of the plurality of CSI change degrees is a CSI change degree calculated by the first device by using at least two pieces of CSI.

In another possible implementation, the transceiver unit 1101 is further configured to send a feedback request to the first device, where the feedback request is used to trigger the first device to feed back a sensing measurement result.

In another possible implementation, the first CSI change degree is a maximum CSI change degree in the plurality of CSI change.

Alternatively, the first CSI change degree is calculated by the first device by using first CSI and second CSI; the first CSI is determined by the first device by using a first NDP, the first NDP is a last but $(Y-1)$ null data packet (NDP) received by the first device, and Y is an integer greater than or equal to 1; and the second CSI is determined by the first device by using a pre-indicated NDP, or the second CSI is determined by the first device by using a $w^{th}$ NDP before the first NDP, and w is an integer greater than or equal to 1.

Alternatively, the first CSI change degree is calculated by the first device by using first CSI and CSI in a CSI set; the first CSI is determined by the first device by using a first NDP, the first NDP is a last but $(Y-1)$ NDP received by the first device, and Y is an integer greater than or equal to 1; and the CSI set includes X pieces of CSI, the X pieces of CSI are respectively determined by the first device by using X NDPs before the first NDP, and X is an integer greater than or equal to 2.

In another possible implementation, the transceiver unit 1101 is further configured to:

receive the maximum CSI change degree in the plurality of CSI change degrees from the first device.

In another possible implementation, an $i^{th}$ CSI change degree in the plurality of CSI change degrees is calculated by the first device by using an $(i+1)^{th}$ piece of CSI and an $i^{th}$ piece of CSI, the $(i+1)^{th}$ piece of CSI is determined by the first device by using an $(i+1)^{th}$ NDP received by the first device, the $i^{th}$ piece of CSI is determined by the first device by using an $i^{th}$ NDP received by the first device, and i is an integer greater than or equal to 1.

Alternatively, an $i^{th}$ CSI change degree is calculated by the first device by using an $(i+1)^{th}$ piece of CSI and the second CSI; the $(i+1)^{th}$ piece of CSI is determined by the first device by using an $(i+1)^{th}$ NDP received by the first device, and i is an integer greater than or equal to 1; and the second CSI is determined by the first device by using a pre-indicated NDP, or the second CSI is determined by the first device by using a $w^{th}$ NDP before a first NDP, the first NDP is a last but $(Y-1)$ null data packet (NDP) received by the first device, Y is an integer greater than or equal to 1, and w is an integer greater than or equal to 1.

Alternatively, an $i^{th}$ CSI change degree is calculated by the first device by using an $(i+1)^{th}$ piece of CSI and an $(i-Q)^{th}$ piece of CSI, the $(i+1)^{th}$ piece of CSI is determined by the first device by using an $(i+1)^{th}$ NDP received by the first device, the $(i-Q)^{th}$ piece of CSI is determined by the first device by using an $(i-Q)^{th}$ NDP received by the first device, i is an integer greater than or equal to 1, Q is an integer greater than or equal to 1, and i is greater than Q.

Alternatively, an $i^{th}$ CSI change degree is calculated by the first device by using an $(i+1)^{th}$ piece of CSI and Z pieces of CSI before the $(i+1)^{th}$ piece of CSI, the $(i+1)^{th}$ piece of CSI is determined by the first device by using an $(i+1)^{th}$ NDP received by the first device, the Z pieces of CSI before the $(i+1)^{th}$ piece of CSI are respectively determined by the first device by using Z NDPs before the $(i+1)^{th}$ NDP received by the first device, i is an integer greater than or equal to 1, and Z is an integer greater than or equal to 1.

In another possible implementation, the transceiver unit 1101 is further configured to:

send first indication information to the first device, where the first indication information indicates Y, and Y is an integer greater than or equal to 1.

In another possible implementation, the transceiver unit 1101 is further configured to:

when the first condition is not met, receive second information from the first device, where the second information indicates that the CSI change degree does not exceed the first threshold.

In another possible implementation, the transceiver unit 1101 is further configured to:

send at least one piece of the following information to the first device: second indication information or third indication information.

The second indication information indicates a plurality of CSI change degree calculation manners used by the first device and/or indicates a multi-CSI change degree scenario or a single-CSI change degree scenario used by the first device The third indication information indicates CSI that corresponds to a null data group NDP latest received by the first device and that is in pieces of CSI that participate in calculation of the plurality of CSI change degrees in the first device.

Figure 12:
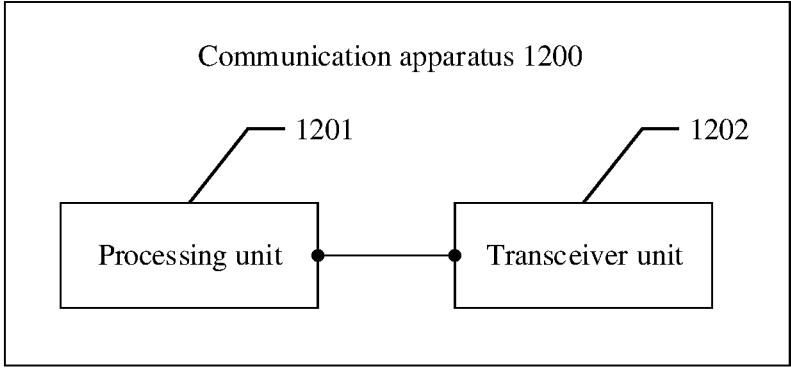
FIG. 12 is another schematic diagram of a structure of an example communication apparatus according to an embodiment of this application.

This application further provides a communication apparatus. As shown in FIG. 12, a communication apparatus 1200 includes a processing unit 1201 and a transceiver unit 1202. The communication apparatus 1200 is configured to implement the method performed by the sensing initiator in the embodiment shown in FIG. 7.

The processing unit 1201 is configured to generate a first frame, where the first frame is used to establish a first sensing session. The first frame includes at least one user field, the at least one user field includes a first user field, and the first user field includes one of the following indications: an association identifier, a responder role indication, a user threshold indication, first user information, and second user information. The first sensing session is a sensing session established between the communication apparatus 1200 and a sensing transmitter or a sensing receiver. The association identifier is an identifier of the sensing transmitter or the sensing receiver, and the association identifier identifies the first sensing session. The responder role indication indicates a role of the sensing transmitter or a role of the sensing receiver. The user threshold indication indicates a user level threshold used in a sensing process of the first sensing session. The first user information is user information that depends on a responder role. The second user information is user information that depends on a session type or a measurement setup type.

The transceiver unit 1202 is configured to send the first frame.

In a possible implementation, the session type or the measurement setup type includes any one of the following: the communication apparatus 1200 is the sensing transmitter, the communication apparatus 1200 is the sensing receiver, or the communication apparatus 1200 is neither the sensing transmitter nor the sensing receiver.

In another possible implementation, the first frame further includes a common field, and the common field includes at least one of the following: a measurement setup identifier, an instantaneous or delayed feedback indication, a sensing transmitter feedback type, a sensing receiver feedback type, a session type or a measurement setup type, a common threshold indication, and a threshold variable indication.

The measurement setup identifier indicates an identification number of one or more sensing sessions. The instantaneous or delayed feedback indication indicates an instantaneous feedback or delayed feedback of a sensing measurement result of one or more sensing sessions. The sensing transmitter feedback type includes at least one of the following: uncompressed channel state information (CSI), compressed CSI, a null data packet (NDP), a sensing measurement result, and a result of a CSI change degree. The sensing receiver feedback type includes at least one of: uncompressed channel state information (CSI), compressed CSI, a null data packet (NDP), a sensing measurement result, and a result of a CSI change degree. The session type or the measurement setup type includes any one of the following: the communication apparatus 1200 is the sensing transmitter, the communication apparatus 1200 is the sensing receiver, and the communication apparatus 1200 is neither the sensing transmitter nor the sensing receiver. The common threshold indication indicates a common threshold used in a sensing process of one or more sensing sessions. The threshold variable indication indicates whether a threshold used in a sensing process of one or more sensing sessions is variable.

In another possible implementation, the transceiver unit 1202 is further configured to:

send first information, where the first information is used to update the threshold used in the sensing process of the first sensing session.

In another possible implementation, if communication apparatus 1200 further plays the role of the sensing receiver, the first information is carried in an NDPA or a feedback request.

Alternatively, if the communication apparatus 1200 further plays the role of the sensing receiver, the first information is carried in a feedback response.

Alternatively, if the communication apparatus 1200 is neither the sensing transmitter nor the sensing receiver, the first information is carried in a response frame, where the response frame is used by the communication apparatus 1200 to respond to the sensing transmitter or the sensing receiver and feed back the sensing measurement result of the first sensing session.

In another possible implementation, the transceiver unit 1202 is further configured to:

send first indication information, where the first indication information indicates that the communication apparatus 1200 is to send an update frame, and the update frame is used to update the threshold used in the sensing process of the first sensing session; and send the update frame.

In another possible implementation, the transceiver unit 1202 is further configured to:

send at least one of the following: second indication information, third indication information, fourth indication information, fifth indication information, and sixth indication information.

The second indication information indicates whether the communication apparatus 1200 supports a threshold-based sensing process. The third indication information indicates that the communication apparatus 1200 supports to be roles/a role of the sensing initiator, the sensing responder, the sensing transmitter, and/or the sensing receiver. The fourth indication information indicates an initial threshold. The fifth indication information indicates whether the threshold used in the sensing process of the sensing session is variable. The sixth indication information indicates an instantaneous feedback or delayed feedback of the sensing measurement result of the sensing session.

Figure 13:
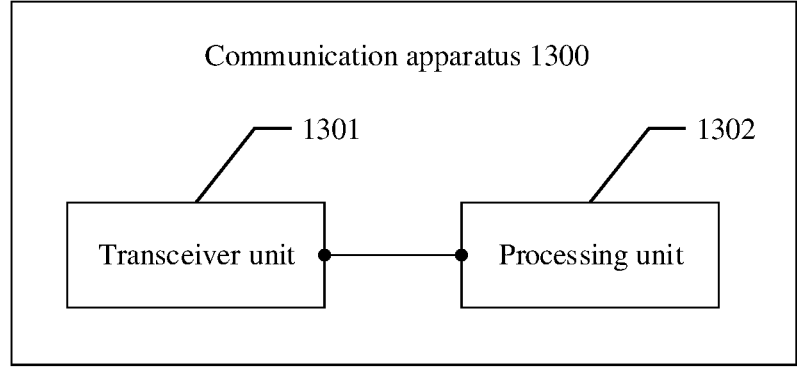
FIG. 13 is another schematic diagram of a structure of an example communication apparatus according to an embodiment of this application.

This application further provides a communication apparatus. As shown in FIG. 13, a communication apparatus 1300 includes a transceiver unit 1301 and a processing unit 1302. The communication apparatus 1300 is configured to implement the method performed by the sensing transmitter or the sensing receiver in the embodiment shown in FIG. 7.

The transceiver unit 1301 is configured to receive a first frame from a sensing initiator, where the first frame is used to establish a first sensing session. The first frame includes at least one user field, the at least one user field includes a first user field, and the first user field includes one of the following indications: an association identifier, a responder role indication, a user threshold indication, first user information, and second user information. The first sensing session is a sensing session established between the sensing initiator and a sensing transmitter or a sensing receiver. The association identifier is an identifier of the sensing transmitter or the sensing receiver, and the association identifier identifies the first sensing session. The responder role indication indicates a role of the sensing transmitter or a role of the sensing receiver. The user threshold indication indicates a user level threshold used in a sensing process of the first sensing session. The first user information is user information that depends on a responder role. The second user information is user information that depends on a session type or a measurement setup type.

The processing unit 1302 is configured to determine information about the first sensing session based on the first frame.

In a possible implementation, the session type or the measurement setup type includes any one of the following: the sensing initiator is the sensing transmitter, the sensing initiator is the sensing receiver, and the sensing initiator is neither the sensing transmitter nor the sensing receiver.

In another possible implementation, the first frame further includes a common field, and the common field includes at least one of the following: a measurement setup identifier, an instantaneous or delayed feedback indication, a sensing transmitter feedback type, a sensing receiver feedback type, a session type or a measurement setup type, a common threshold indication, and a threshold variable indication.

The measurement setup identifier indicates an identification number of one or more sensing sessions. The instantaneous or delayed feedback indication indicates an instantaneous feedback or delayed feedback of a sensing measurement result of one or more sensing sessions. The sensing transmitter feedback type includes at least one of the following: uncompressed channel state information (CSI), compressed CSI, a null data packet (NDP), a sensing measurement result, and a result of a CSI change degree. The sensing receiver feedback type includes at least one of the following: uncompressed channel state information (CSI), compressed CSI, a null data packet (NDP), a sensing measurement result, or a result of a CSI change degree. The session type or the measurement setup type includes any one of the following: the sensing initiator is the sensing transmitter, the sensing initiator is the sensing receiver, and the sensing initiator is neither the sensing transmitter nor the sensing receiver. The common threshold indication indicates a common threshold used in a sensing process of one or more sensing sessions. The threshold variable indication indicates whether a threshold used in a sensing process of one or more sensing sessions is variable.

In another possible implementation, the transceiver unit 1301 is further configured to:

receive first information from the sensing initiator, where the first information is used to update the threshold used in the sensing process of the first sensing session. The processing unit 1302 is further configured to:
determine an updated threshold based on the first information.

In another possible implementation, if the sensing initiator further plays the role of the sensing receiver, the first information is carried in an NDPA or a feedback request.

Alternatively, if the sensing initiator further plays the role of the sensing receiver, the first information is carried in a feedback response.

Alternatively, if the sensing initiator is neither the sensing transmitter nor the sensing receiver, the first information is carried in a response frame, where the response frame is used by the sensing initiator to respond to the sensing transmitter or the sensing receiver and feed back the sensing measurement result of the first sensing session.

In another possible implementation, the transceiver unit 1301 is further configured to:
receive first indication information from the sensing initiator, where the first indication information indicates that the sensing initiator is to send an update frame, and the update frame is used to update the threshold used in the sensing process of the first sensing session.
The processing unit 1302 is further configured to:
determine, based on the first indication information, that the sensing initiator is to send the update frame.
The transceiver unit 1301 is further configured to:
receive the update frame from the sensing initiator.
The processing unit 1302 is further configured to:
determine an updated threshold based on the update frame.

In another possible implementation, the transceiver unit 1301 is further configured to:
receive at least one of the following from the sensing initiator: second indication information, third indication information, fourth indication information, fifth indication information, and sixth indication information.

The second indication information indicates whether the sensing initiator supports a threshold-based sensing process. The third indication information indicates that the sensing initiator supports to be roles/a role of the sensing initiator, the sensing responder, the sensing transmitter, and/or the sensing receiver. The fourth indication information indicates an initial threshold. The fifth indication information indicates whether the threshold used in the sensing process of the sensing session is variable. The sixth indication information indicates an instantaneous feedback or delayed feedback of the sensing measurement result of the sensing session.

It should be noted that in embodiments of this application, division into modules is an example, and is only a logical function division. During actual implementation, there may be another division manner. In addition, functional units in embodiments of this application may be integrated into one processing unit, or may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

Figure 14:
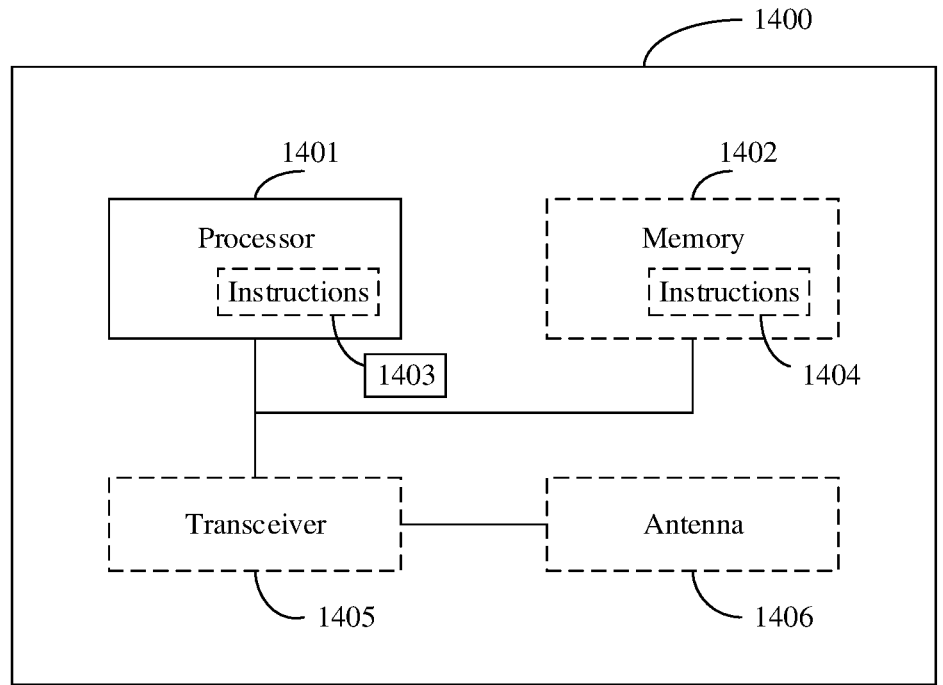
FIG. 14 is another schematic diagram of a structure of an example communication apparatus according to an embodiment of this application.

Based on a same technical concept as the foregoing communication method, as shown in FIG. 14, an embodiment of this application further provides a schematic diagram of a structure of a communication apparatus 1400. The communication apparatus 1400 may be configured to implement the methods described in the foregoing method embodiments.

The communication apparatus 1400 includes one or more processors 1401. The processor 1401 may be a general-purpose processor, a dedicated processor, or the like. For example, the processor may be a baseband processor or a central processing unit. The baseband processor may be configured to process a communication protocol and communication data. The central processing unit may be configured to: control a communication apparatus (for example, a base station, a terminal, or a chip), execute a software program, and process data of the software program. The communication apparatus may include a transceiver unit, configured to input (receive) and output (send) a signal. For example, the transceiver unit may be a transceiver or a radio frequency chip.

The communication apparatus 1400 includes one or more processors 1401, and the one or more processors 1401 may implement the method described in the foregoing embodiment.

Optionally, the processor 1401 may further implement another function in addition to the method in the foregoing embodiment.

Optionally, in a design, the processor 1401 may execute instructions, so that the communication apparatus 1400 performs the method described in the foregoing method embodiment. All or a part of the instructions, for example, an instruction 1403, may be stored in the processor. Alternatively, all or a part of the instructions, for example, an instruction 1404, may be stored in a memory 1402 coupled to the processor. Alternatively, the communication apparatus 1400 may be enabled, by using both the instructions 1403 and 1404, to perform the method described in the foregoing method embodiment.

In still another possible design, the communication apparatus 1400 may also include a logic circuit, and the logic circuit may implement the method described in the foregoing method embodiment.

In still another possible design, the communication apparatus 1400 may include one or more memories 1402. The memory stores instructions 1404. The instructions may be run on the processor, so that the communication apparatus 1400 performs the methods described in the foregoing method embodiments. Optionally, the memory may further store data. Optionally, the processor may also store instructions and/or data. For example, the one or more memories 1402 may store the correspondence described in the foregoing embodiments, or the related parameter or table provided in the foregoing embodiments. The processor and the memory may be separately disposed, or may be integrated together.

In still another possible design, the communication apparatus 1400 may further include a transceiver 1405 and an antenna 1406. The processor 1401 may be referred to as a processing unit, and controls the apparatus (a terminal or a base station). The transceiver 1405 may be referred to as a transceiver, a transceiver circuit, an input/output interface circuit, a transceiver unit, or the like, and is configured to implement a transceiver function of the apparatus by using the antenna 1406.

It should be noted that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any memory of another proper type.

An embodiment of this application further provides a computer-readable medium. The computer-readable medium stores a computer program. When the computer program is executed by a computer, the method described in the foregoing method embodiment is implemented.

An embodiment of this application further provides a computer program product. When the computer program product is executed by a computer, the method described in the foregoing method embodiment is implemented.

An embodiment of this application further provides a communication system. The communication system includes a first device, a second device, and a third device. The first device may implement the steps performed by the first device in the embodiment shown in FIG. 4, the second device may implement the steps performed by the second device in the embodiment shown in FIG. 4, and the third device may implement the steps performed by the third device in the embodiment shown in FIG. 4. Optionally, the communication system further includes a fourth device. The fourth device is configured to perform the steps performed by the fourth device in the embodiment shown in FIG. 4; or the communication system includes a sensing initiator and a sensing transmitter, or includes a sensing initiator and a sensing receiver. The sensing initiator is configured to perform the steps performed by the sensing initiator in the embodiment shown in FIG. 7. The sensing transmitter is configured to perform the steps performed by the sensing transmitter in the embodiment shown in FIG. 7, and the sensing receiver is configured to perform the steps performed by the sensing receiver in the embodiment shown in FIG. 7.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

An embodiment of this application further provides a processing apparatus, including a processor and an interface. The processor is configured to perform the method described in the foregoing method embodiment.

It should be understood that the processing apparatus may be a chip. The processor may be implemented by hardware, or may be implemented by software. When the processor is implemented by the hardware, the processor may be a logic circuit, an integrated circuit, or the like. When the processor is implemented by the software, the processor may be a general-purpose processor. The general-purpose processor is implemented by reading software code stored in a memory.

The memory may be integrated into the processor, or may be located outside the processor and exist independently.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objective of the solutions of embodiments.

In addition, function units in embodiments of this application may be integrated into one processing unit, each of the units may exist alone physically, or two or more units may be integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communication medium. The communication medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be properly defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk and a disc used in this application include a compact disc (CD), a laser disc, an optical disc, a digital versatile disc (DVD), a floppy disk, and a Blu-ray disc, where the disk generally copies data in a magnetic manner, and the disc copies data optically in a laser manner. The foregoing combination should also be included in the protection scope of the computer-readable medium.

What is claimed is:

1. A communication method, comprising:
receiving, by a first device, a plurality of null data packets (NDPs) from a second device, wherein each of the plurality of NDPs corresponds to one piece of channel state information (CSI); and
when a first condition is met, sending, by the first device, first information to a third device, wherein the first information indicates that a CSI change degree exceeds a first threshold, wherein
the first condition comprises: 1) a first CSI change degree in a plurality of CSI change degrees of the first device exceeds the first threshold, or 2) a ratio of a quantity of CSI change degrees that exceed the first threshold in the plurality of CSI change degrees to a total number of the plurality of CSI change degrees is greater than a second threshold, wherein the plurality of CSI change degrees are determined based on pieces of CSI corresponding to the plurality of NDPs.

2. The method according to claim 1, wherein the second device and the third device are the same device, the first device is a sensing receiver, and the second device is a sensing transmitter.

3. The method according to claim 1, wherein the first device is a first sensing receiver, the second device is a sensing transmitter, and the third device is a sensing initiator or a second sensing receiver.

4. The method according to claim 1, wherein each of the plurality of CSI change degrees is calculated by the first device by using at least two pieces of CSI.

5. The method according to claim 1, further comprising:
determining, by the first device, the plurality of CSI change degrees by using the pieces of CSI corresponding to the plurality of NDPs.

6. The method according to claim 1, further comprising:
receiving, by the first device, a feedback request from the third device, wherein the feedback request is used to trigger the first device to feed back a sensing measurement result.

7. The method according to claim 1, wherein the first CSI change degree is a maximum CSI change degree in the plurality of CSI change degrees;
the first CSI change degree is calculated by the first device by using first CSI and second CSI; the first CSI is determined by the first device by using a first null data packet (NDP), the first NDP is a last but (Y−1) null data packet (NDP) received by the first device, and Y is an integer greater than or equal to 1; and the second CSI is determined by the first device by using a pre-indicated NDP, or the second CSI is determined by the first device by using a $w^{th}$ NDP before the first NDP, and w is an integer greater than or equal to 1; or
the first CSI change degree is calculated by the first device by using first CSI and CSI in a CSI set; the first CSI is determined by the first device by using a first NDP, the first NDP is a last but (Y−1) null data packet (NDP) received by the first device, and Y is an integer greater than or equal to 1; and the CSI set comprises X pieces of CSI, the X pieces of CSI are respectively determined by the first device by using X NDPs before the first NDP, and X is an integer greater than or equal to 2.

8. The method according to claim 7, further comprising:
receiving, by the first device, first indication information from the second device or the third device, wherein the first indication information indicates Y.

9. The method according to claim 1, wherein the method further comprises:
sending, by the first device, a maximum CSI change degree in the plurality of CSI change degrees to the third device.

10. The method according to claim 1, wherein
an $i^{th}$ CSI change degree in the plurality of CSI change degrees is calculated by the first device by using an $(i+1)^{th}$ piece of CSI and an $i^{th}$ piece of CSI, the $(i+1)^{th}$ piece of CSI is determined by the first device by using an $(i+1)^{th}$ NDP received by the first device, the $i^{th}$ piece of CSI is determined by the first device by using an $i^{th}$ NDP received by the first device, and i is an integer greater than or equal to 1;
an $i^{th}$ CSI change degree is calculated by the first device by using an $(i+1)^{th}$ piece of CSI and the second CSI; the $(i+1)^{th}$ piece of CSI is determined by the first device by using an $(i+1)^{th}$ NDP received by the first device, and i is an integer greater than or equal to 1; and the second CSI is determined by the first device by using a pre-indicated NDP, or the second CSI is determined by the first device by using a $w^{th}$ NDP before a first null data packet (NDP), the first NDP is a last but (Y−1) NDP received by the first device, Y is an integer greater than or equal to 1, and w is an integer greater than or equal to 1;
an $i^{th}$ CSI change degree is calculated by the first device by using an $(i+1)^{th}$ piece of CSI and an $(i-Q)^{th}$ piece of CSI, the $(i+1)^{th}$ piece of CSI is determined by the first device by using an $(i+1)^{th}$ NDP received by the first device, the $(i-Q)^{th}$ piece of CSI is determined by the first device by using an $(i-Q)^{th}$ NDP received by the first device, i is an integer greater than or equal to 1, Q is an integer greater than or equal to 1, and i is greater than Q; or
an $i^{th}$ CSI change degree is calculated by the first device by using an $(i+1)^{th}$ piece of CSI and Z pieces of CSI before the $(i+1)^{th}$ piece of CSI, the $(i+1)^{th}$ piece of CSI is determined by the first device by using an $(i+1)^{th}$ NDP received by the first device, the Z pieces of CSI before the $(i+1)^{th}$ piece of CSI are respectively determined by the first device by using Z NDPs before the $(i+1)^{th}$ NDP received by the first device, i is an integer greater than or equal to 1, and Z is an integer greater than or equal to 1.

11. The method according to claim 1, further comprising:
when the first condition is not met, sending, by the first device, second information to the third device, wherein the second information indicates that the CSI change degree does not exceed the first threshold.

12. A communication apparatus, comprising a processor and a memory, wherein the processor is coupled to the memory, and the memory stores a computer program that, when executed by the processor, cause the communication apparatus to perform operations comprising:

receiving a plurality of null data packets (NDPs) from a second device, wherein each of the plurality of NDPs corresponds to one piece of channel state information (CSI); and when a first condition is met, sending first information to a third device, wherein the first information indicates that a CSI change degree exceeds a first threshold; and the first condition comprises: 1) a first CSI change degree in a plurality of CSI change degrees of the communication apparatus exceeds the first threshold, or 2) a ratio of a quantity of CSI change degrees that exceed the first threshold in the plurality of CSI change degrees to a total number of the plurality of CSI change degrees is greater than a second threshold, wherein the plurality of CSI change degrees are determined based on pieces of CSI corresponding to the plurality of NDPs.

13. The communication apparatus according to claim 12, wherein the second device and the third device are the same device, the communication apparatus is a sensing receiver, and the second device is a sensing transmitter.

14. The communication apparatus according to claim 12, wherein the communication apparatus is a first sensing receiver, the second device is a sensing transmitter, and the third device is a sensing initiator or a second sensing receiver.

15. The communication apparatus according to claim 12, wherein each of the plurality of CSI change degrees is calculated by using at least two pieces of CSI.

16. The communication apparatus according to claim 12, wherein the operations further comprise:

determining the plurality of CSI change degrees by using the pieces of CSI corresponding to the plurality of NDPs.

17. The communication apparatus according to claim 12, wherein the operations further comprise:

receiving a feedback request from the third device, to trigger the communication apparatus to feed back a sensing measurement result.

18. A non-transitory computer-readable storage medium, comprising a computer program or instructions that, when run on a first device, cause(s) the first device to perform operations comprising:

receiving a plurality of null data packets (NDPs) from a second device, wherein each of the plurality of NDPs corresponds to one piece of channel state information (CSI); and when a first condition is met, sending first information to a third device, wherein the first information indicates that a CSI change degree exceeds a first threshold, wherein the first condition comprises: 1) a first CSI change degree in a plurality of CSI change degrees of the first device exceeds the first threshold, or 2) a ratio of a quantity of CSI change degrees that exceed the first threshold in the plurality of CSI change degrees to a total number of the plurality of CSI change degrees is greater than a second threshold, wherein the plurality of CSI change degrees are determined based on pieces of CSI corresponding to the plurality of NDPs.

19. The non-transitory computer-readable storage medium according to claim 18, wherein the second device and the third device are the same device, the first device is a sensing receiver, and the second device is a sensing transmitter.

20. The non-transitory computer-readable storage medium according to claim 18, wherein the first device is a first sensing receiver, the second device is a sensing transmitter, and the third device is a sensing initiator or a second sensing receiver.

* * * * *